(12) United States Patent
Furtado et al.

(10) Patent No.: US 10,171,472 B2
(45) Date of Patent: *Jan. 1, 2019

(54) ROLE-SPECIFIC SERVICE CUSTOMIZATION

(71) Applicant: Microsoft Technology Licensing, LLC, Redmond, WA (US)

(72) Inventors: Andre Wilson Brotto Furtado, Kirkland, WA (US); Robert L. Rounthwaite, Fall City, WA (US); Xiaohan Shi, Sammamish, WA (US); Matthew Richardson, Seattle, WA (US); Ryen White, Woodinville, WA (US); Syed Fahad Allam Shah, Bellevue, WA (US); Shantanu Sharma, New Castle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/058,464

(22) Filed: Mar. 2, 2016

(65) Prior Publication Data

US 2017/0257373 A1   Sep. 7, 2017

(51) Int. Cl.
*G06F 21/00* (2013.01)
*H04L 29/06* (2006.01)
(Continued)

(52) U.S. Cl.
CPC ........ *H04L 63/102* (2013.01); *G06Q 10/107* (2013.01); *G06Q 50/01* (2013.01)

(58) Field of Classification Search
CPC ..... H04L 63/102; G06Q 10/107; G06Q 50/01
See application file for complete search history.

(56) References Cited

U.S. PATENT DOCUMENTS 5,428,773 A    6/1995   Berkovich
5,594,791 A *  1/1997   Szlam .................. G06Q 30/016
                                                379/265.09
(Continued)

FOREIGN PATENT DOCUMENTS

WO    WO 2015074030 A2 *   5/2015   ............. H04L 67/30
WO    WO-2015074030 A2 *   5/2015   ............. H04L 67/30

OTHER PUBLICATIONS

"International Search Report and Written Opinion Issued in PCT Application No. PCT/US2017/019283", dated Apr. 19, 2017, 12 Pages.
(Continued)

*Primary Examiner* — David Garcia Cervetti
(74) *Attorney, Agent, or Firm* — The Watson I.P. Group, PLC; Vladan M. Vasiljevic

(57) ABSTRACT

In many computing scenarios, an individual may choose to interact with a service in a variety of roles, and may therefore create a set of accounts respectively representing the service. However, the use of multiple accounts by the same individual may introduce considerable administrative complications (e.g., failing to update all accounts with new information results in stale and/or conflicting account information), and may reduce the efficiency and/or scalability of the service. Presented herein are techniques for enabling individuals to interact with services through various roles. Such techniques involve evaluating the individual's role determinants to identify and automatically select the individual's current role; selecting a current role profile, as a subset of the details of the individual profile that are associated with the current role, and excluding details that are not associated with the current role; and performing the service according to the current role profile of the individual.

20 Claims, 14 Drawing Sheets

(51) Int. Cl.
*G06Q 10/10* (2012.01)
*G06Q 50/00* (2012.01)

(56) References Cited

U.S. PATENT DOCUMENTS

| | | | |
|---|---|---|---|
| 6,105,063 A | 8/2000 | Hayes, Jr. | |
| 6,163,607 A * | 12/2000 | Bogart | H04M 3/5233 |
| | | | 379/265.02 |
| 6,205,418 B1 * | 3/2001 | Li | G06F 17/289 |
| | | | 704/8 |
| 6,385,627 B1 * | 5/2002 | Cragun | G06Q 10/10 |
| | | | 709/201 |
| 7,089,243 B1 * | 8/2006 | Zhang | G06F 17/3056 |
| 7,480,934 B2 * | 1/2009 | Chan | G06F 21/41 |
| | | | 709/204 |
| 7,568,217 B1 * | 7/2009 | Prasad | G06F 21/6218 |
| | | | 726/3 |
| 7,644,008 B1 * | 1/2010 | Issa | G06Q 10/06 |
| | | | 705/7.11 |
| 7,787,870 B2 | 8/2010 | Burgan et al. | |
| 7,860,888 B2 * | 12/2010 | Buchholz | G06F 21/6218 |
| | | | 707/783 |
| 7,890,998 B2 * | 2/2011 | Lu | G06F 21/6218 |
| | | | 709/223 |
| 8,233,604 B2 * | 7/2012 | Lei | H04L 67/24 |
| | | | 379/201.02 |
| 8,233,943 B1 | 7/2012 | Othmer et al. | |
| 8,332,761 B2 | 12/2012 | Cox et al. | |
| 8,402,514 B1 * | 3/2013 | Thompson | H04L 63/08 |
| | | | 726/4 |
| 8,473,440 B2 | 6/2013 | Brown | |
| 8,549,061 B2 | 10/2013 | Rao et al. | |
| 8,645,843 B2 * | 2/2014 | Chee | G06Q 10/10 |
| | | | 709/206 |
| 8,688,095 B2 | 4/2014 | Rice | |
| 8,775,438 B1 * | 7/2014 | Brooker | G06F 9/5027 |
| | | | 707/748 |
| 8,869,244 B1 * | 10/2014 | Sundaram | G06F 21/6218 |
| | | | 726/4 |
| 9,021,031 B1 * | 4/2015 | Jansson | H04L 67/24 |
| | | | 709/206 |
| 9,330,276 B2 * | 5/2016 | Banks | G06F 21/6227 |
| 9,621,585 B1 * | 4/2017 | Satish | H04L 63/20 |
| 9,638,537 B2 * | 5/2017 | Abramson | G01C 21/3626 |
| 9,686,366 B2 * | 6/2017 | Bank | H04L 67/22 |
| 9,727,845 B2 | 8/2017 | Cooper et al. | |
| 9,749,415 B2 * | 8/2017 | Dain | H04L 67/2861 |
| 9,762,669 B2 * | 9/2017 | Dain | H04L 67/2861 |
| 2003/0182394 A1 | 9/2003 | Ryngler et al. | |
| 2005/0080889 A1 | 4/2005 | Malik et al. | |
| 2005/0278294 A1 * | 12/2005 | Beartusk | G06Q 10/06 |
| 2006/0090208 A1 | 4/2006 | Smith | |
| 2006/0193450 A1 | 8/2006 | Flynt et al. | |
| 2006/0218394 A1 * | 9/2006 | Yang | G06F 21/604 |
| | | | 713/167 |
| 2006/0225064 A1 * | 10/2006 | Lee | G06F 9/465 |
| | | | 717/168 |
| 2007/0004386 A1 * | 1/2007 | Singh | H04L 63/102 |
| | | | 455/414.1 |
| 2007/0033196 A1 * | 2/2007 | Moore | G06F 21/62 |
| 2007/0033571 A1 * | 2/2007 | Moore | G06Q 10/06 |
| | | | 717/104 |
| 2007/0136294 A1 * | 6/2007 | Morinville | G06F 21/604 |
| 2007/0185875 A1 * | 8/2007 | Chang | G06F 21/604 |
| 2007/0288503 A1 * | 12/2007 | Taylor | G06F 17/30867 |
| 2007/0293212 A1 * | 12/2007 | Quon | H04M 3/42365 |
| | | | 455/420 |
| 2008/0046433 A1 | 2/2008 | Kool-brown et al. | |
| 2008/0134320 A1 * | 6/2008 | Desai | G06F 21/6218 |
| | | | 726/21 |
| 2008/0152114 A1 * | 6/2008 | Kim | H04M 3/56 |
| | | | 379/205.01 |
| 2008/0189654 A1 * | 8/2008 | Thomas | G06F 17/30867 |
| | | | 715/805 |
| 2008/0215560 A1 * | 9/2008 | Bell | G06F 17/30554 |
| 2008/0281915 A1 * | 11/2008 | Elad | G06Q 10/10 |
| | | | 709/204 |
| 2008/0304512 A1 * | 12/2008 | Jung | H04M 1/663 |
| | | | 370/464 |
| 2008/0304648 A1 * | 12/2008 | Jung | H04M 3/42008 |
| | | | 379/218.01 |
| 2008/0305806 A1 * | 12/2008 | Jung | H04L 29/12783 |
| | | | 455/456.1 |
| 2009/0003581 A1 * | 1/2009 | Erb | H04M 1/2472 |
| | | | 379/216.01 |
| 2009/0024432 A1 * | 1/2009 | Bauters | G06Q 10/06 |
| | | | 705/7.15 |
| 2009/0193494 A1 * | 7/2009 | Ratliff | G06N 3/006 |
| | | | 726/1 |
| 2009/0288090 A1 * | 11/2009 | Ujibashi | G06F 9/5011 |
| | | | 718/103 |
| 2010/0211428 A1 * | 8/2010 | Duffy | G06Q 10/06 |
| | | | 705/7.14 |
| 2010/0211884 A1 | 8/2010 | Kashyap et al. | |
| 2010/0287131 A1 * | 11/2010 | Church | G06Q 10/00 |
| | | | 706/47 |
| 2010/0293543 A1 | 11/2010 | Erhart et al. | |
| 2010/0306268 A1 * | 12/2010 | Bhatti | G06F 21/604 |
| | | | 707/783 |
| 2011/0014923 A1 * | 1/2011 | Krco | H04W 8/06 |
| | | | 455/450 |
| 2011/0022405 A1 * | 1/2011 | Heinz | G06Q 10/02 |
| | | | 705/1.1 |
| 2011/0055207 A1 | 3/2011 | Schorzman et al. | |
| 2011/0061008 A1 * | 3/2011 | Gupta | G06F 17/30598 |
| | | | 715/764 |
| 2011/0162046 A1 * | 6/2011 | Forster | G06F 21/41 |
| | | | 726/4 |
| 2011/0225139 A1 * | 9/2011 | Wang | G06F 17/30867 |
| | | | 707/709 |
| 2011/0321159 A1 * | 12/2011 | Nestler | G06F 21/604 |
| | | | 726/21 |
| 2012/0011358 A1 | 1/2012 | Masone | |
| 2012/0117531 A1 * | 5/2012 | Rosenbaum | G06F 9/449 |
| | | | 717/100 |
| 2012/0185419 A1 * | 7/2012 | Kuhn | H04M 1/72569 |
| | | | 706/12 |
| 2012/0233222 A1 * | 9/2012 | Roesch | H04L 63/1408 |
| | | | 707/812 |
| 2012/0246230 A1 * | 9/2012 | Ferbar | G06Q 50/01 |
| | | | 709/204 |
| 2013/0024229 A1 * | 1/2013 | Agrawal | G06Q 10/06 |
| | | | 705/7.14 |
| 2013/0031070 A1 * | 1/2013 | Ducharme | G06F 17/30289 |
| | | | 707/705 |
| 2013/0117238 A1 * | 5/2013 | Gower | G06F 11/1412 |
| | | | 707/684 |
| 2013/0145285 A1 * | 6/2013 | Klinger | G06Q 10/00 |
| | | | 715/753 |
| 2013/0151705 A1 * | 6/2013 | Menon | G06Q 10/1053 |
| | | | 709/226 |
| 2013/0152216 A1 | 6/2013 | Stevens | |
| 2013/0173765 A1 * | 7/2013 | Korbecki | H04N 21/42209 |
| | | | 709/221 |
| 2013/0283211 A1 * | 10/2013 | Malkin | G06Q 10/06 |
| | | | 715/844 |
| 2014/0057589 A1 | 2/2014 | Velusamy et al. | |
| 2014/0067535 A1 | 3/2014 | Rezaei et al. | |
| 2014/0089150 A1 * | 3/2014 | Wong | G06Q 10/06 |
| | | | 705/30 |
| 2014/0090021 A1 * | 3/2014 | Berkovitz | G06F 21/41 |
| | | | 726/4 |
| 2014/0090026 A1 * | 3/2014 | Mishra | G06F 21/604 |
| | | | 726/4 |
| 2014/0090091 A1 * | 3/2014 | Prakash | G06F 21/6245 |
| | | | 726/30 |
| 2014/0094311 A1 * | 4/2014 | Kikuchi | G07F 17/3274 |
| | | | 463/40 |
| 2014/0101556 A1 * | 4/2014 | Pinard | G06Q 10/06 |
| | | | 715/734 |

(56) References Cited

U.S. PATENT DOCUMENTS

| | | | | |
|---|---|---|---|---|
| 2014/0122507 A1* | 5/2014 | Zeng | G06F 17/30867 | 707/749 |
| 2014/0129273 A1* | 5/2014 | Versteeg | G06F 17/30286 | 705/7.14 |
| 2014/0136546 A1 | 5/2014 | Satalkar et al. | | |
| 2014/0143016 A1* | 5/2014 | Walker | G06Q 30/0203 | 705/7.32 |
| 2014/0157138 A1* | 6/2014 | Kuscher | G06Q 10/10 | 715/739 |
| 2014/0157350 A1* | 6/2014 | Wang | G06F 21/604 | 726/1 |
| 2014/0168071 A1* | 6/2014 | Ahmed | H04N 5/23206 | 345/156 |
| 2014/0172486 A1* | 6/2014 | Kwan | G06Q 10/063118 | 705/7.17 |
| 2014/0215604 A1* | 7/2014 | Giblin | G06F 11/328 | 726/21 |
| 2014/0237039 A1* | 8/2014 | Bank | H04L 67/22 | 709/204 |
| 2014/0359695 A1* | 12/2014 | Chari | H04L 63/20 | 726/1 |
| 2014/0379699 A1* | 12/2014 | Blyumen | G06F 3/04842 | 707/722 |
| 2014/0379729 A1* | 12/2014 | Savage | H04L 65/403 | 707/748 |
| 2015/0100890 A1 | 4/2015 | Kosmiskas et al. | | |
| 2015/0106917 A1* | 4/2015 | Kwok | G06F 21/6218 | 726/17 |
| 2015/0127406 A1 | 5/2015 | Hoen et al. | | |
| 2015/0143532 A1* | 5/2015 | Toffa | H04L 67/30 | 726/26 |
| 2015/0262430 A1* | 9/2015 | Farrelly | H04L 67/306 | 705/13 |
| 2015/0304792 A1 | 10/2015 | Henderson et al. | | |
| 2016/0094938 A1* | 3/2016 | Upadhyaya | H04W 4/02 | 455/456.3 |
| 2016/0171616 A1* | 6/2016 | Wagner | G06Q 40/08 | 705/4 |
| 2016/0217431 A1* | 7/2016 | Pinard | G06Q 10/1095 | |
| 2016/0261616 A1* | 9/2016 | Shulman | H04L 63/1416 | |
| 2016/0269906 A1* | 9/2016 | Braden | G06F 21/32 | |
| 2016/0277235 A1* | 9/2016 | Bhesania | H04L 41/0803 | |
| 2017/0097827 A1* | 4/2017 | Furtado | G06Q 10/00 | |
| 2017/0147790 A1* | 5/2017 | Patel | G06F 19/363 | |
| 2017/0214576 A1* | 7/2017 | Pan | G06F 11/3495 | |
| 2017/0257362 A1* | 9/2017 | Maheshwari | G06F 8/60 | |

OTHER PUBLICATIONS

Angulo, et al., "Identity management through "profiles": prototyping an online information segregation service", In Proceedings of the 15th international conference on Human-Computer Interaction: users and contexts of use—vol. Part III, Jul. 21, 2013, pp. 10-19. http://prisec.kau.se/pdf/Angulo2013a.pdf.

Roy, Leena., "Enterproid Separates Professional and Personal Lives on Android Phones", Published on: Feb. 28, 2011, pp. 1-5, Available at: http://techcrunch.com/2011/02/28/enterproid-separates-professional-and-personal-lives-on-android-phones/.

Ozenc, et al., "Life "Modes" in Social Media", In Proceedings of the SIGCHI Conference on Human Factors in Computing Systems, May 7, 2011, pp. 561-570, http://dl.acm.org/citation.cfm?id=1979022.

Rios, et al., "Technologies lead to adaptability and lifelong engagement with culture throughout the Cloud", Published on: Jun. 2, 2014, pp. 1-41 Available at: http://www.tagcloudproject.eu/?wpfb_dl=232.

"Definition of Complementary", Retrieved from https://www.merriam-webster.com/dictionary/complementary, Retrieved Date: Oct. 13, 2017, 1 Page.

"Final Office Action Issued in U.S. Appl. No. 14/876,409", dated Oct. 19, 2017, 16 Pages.

"Non Final Office Action Issued in U.S. Appl. No. 14/876,409", dated Feb. 27, 2017, 27 Pages.

"International Search Report and Written Opinion Issued in PCT Application No. PCT/US2016/054032", dated Nov. 21, 2016, 10 Pages.

"Second Written Opinion Issued in PCT Application No. PCT/US2016/054032", dated Sep. 26, 2017, 6 Pages.

\* cited by examiner

ROLE-SPECIFIC SERVICE CUSTOMIZATION

BACKGROUND

Within the field of computing, many scenarios involve the provision of a service to an individual that is personalized based on various details about the individual. As a first such example, a recommendation service may identify products and/or services that may be interesting to the individual based on the individual's interests or related purchases. As a second such example, a social network may recommend connections between the individual and other individuals having a similar background and/or perspective as the individual. As a third such example, a query processor may evaluate, and optionally disambiguate, a query based on the details of an individual profile of the individual.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

An individual for whom a service is provided may occupy one or more roles, based on the individual's personality, activities, and/or social connections. For example, an individual may, at various times, alternatively be a student, a professional, a family member, a friend, and a sports player, or may concurrently occupy a combination of such roles. In each role, the individual may have a specific set of interests, and may wish to portray a particular persona or image to other individuals.

In order to achieve the interaction with a service based on a variety of roles, an individual may create a series of accounts, each represented by an individual profile that comprises the details that the individual wishes to exhibit for a particular role. The individual may then login to an account associated with a particular role, and may interact with the service according to the particular role until the individual concludes the interaction or wishes to utilize a second role. The individual may then logout of the current account and login to another account for the second role. Alternatively, the user may create and utilize several accounts with a particular service to represent the user in different roles (e.g., a first account with an e-commerce vendor for personal purchases, and a second account with the same e-commerce vendor for purchases as an employee).

However, since the service regards each account as representing a particular individual, the service may not recognize that two or more accounts represent the same individual in multiple roles. The service may therefore prevent a first account of the individual from accessing resources that are accessible to a second account of the same individual. Such role-based accounts may therefore exhibit a number of disadvantages. As a first such example, the service may undesirably restrict the individual from interaction in the account of a first role while the individual is utilizing the account of a second role; e.g., a message intended for the individual may have been delivered to the first account, but the individual may be logged into the second account and may therefore not receive the message. As a second such example, the individual may have to update the same individual profile details separately for each account; e.g., if the individual moves from a first city to a second city, the individual may have to update the individual's residential information for many different accounts, and accounts that the individual fails to update may utilize incorrect information. As a third such example, the individual may wish to interact with a service concurrently in two roles, but the service may not permit the individual to interact with the service concurrently through two distinct accounts. As a fourth such example, if the individual frequently switches roles, the individual may have to logout and login to new accounts frequently, which may be frustrating for the individual. As a fifth such example, if the individual forgets to switch accounts or accidentally logs into a different account than the individual's intended role, the service may interact with the individual in an unintended role. As a sixth such example, because the service does not recognize multiple accounts as belonging to the same individual, a service to be provided to each individual may be redundantly provided for multiple accounts of the same individual; e.g., a message to be delivered to each individual may be stored for each of five accounts for the same individual, and the individual may then receive five copies of the same message.

Presented herein are techniques for enabling a service to interact with an individual represented by a variety of roles. In accordance with these techniques, an individual may be represented by an individual profile including the details for at least two roles. Role determinants of the individual may be evaluated to determine, among the at least two roles, a current role of the individual. Among the details of the individual profile, a current role profile may be identified, comprising the subset of details that pertain to the current role and excluding details that do not pertain to the current role. The service may then interact with the individual according to the details of the current role profile. In this manner, the service may interact with the individual according to the individual's current role, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
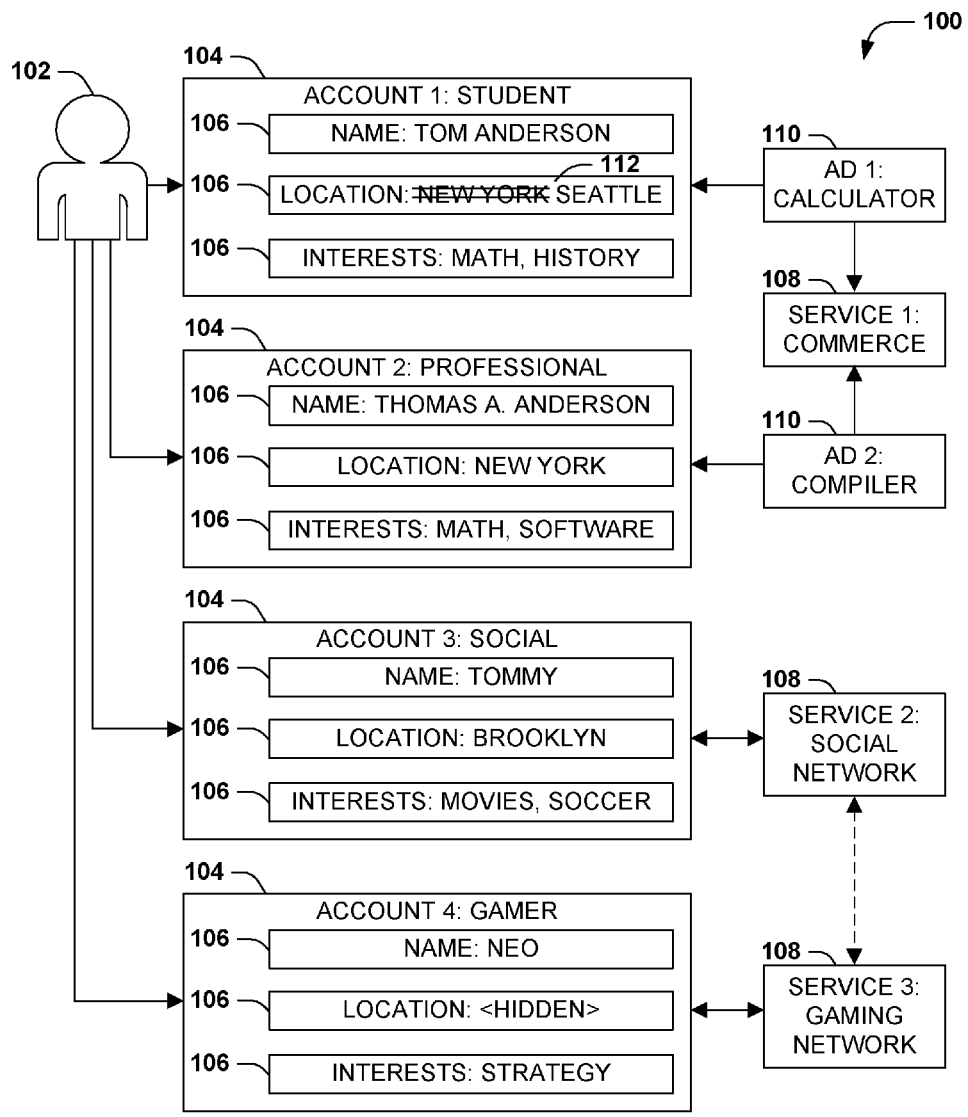
FIG. 1 is an illustration of an example scenario featuring an interaction of an individual with a service.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an example scenario 100 featuring a provision to an individual 102 of various services 108, such as a commercial service that provides products and services to the individual 102; a social network 108 that enables communication between the individual 102 and various contacts; and a gaming network that enables the individual 102 play games with other individuals. In this example scenario 100, each service 108 may enable the individual 102 to create an account 104 featuring a set of individual profile details 106 of the individual 102, such as the name, location, and skills or interests of the individual 102. However, the individual 102 utilizes the services 108 through a variety of roles, such as a student role; a professional role; a social role; and a gamer role. Moreover, while interacting with the various services 108 in each role, the individual 102 may wish to exhibit a different set of individual profile details 106; e.g., the individual 102 may wish to use one name when interacting with a particular service 108 in a first role, and a different name while interacting with a particular service 108 in a second role.

In order to achieve such variance, the individual 102 may create a set of accounts 104, each representing the individual 102 according to a role, and representing the individual 102 with a set of individual profile details 106 that relate to the associated role. For example, the first account 104 may represent the individual 102 in a student role, with a casual name, a general city name, and a set of academic interests; a second account 104 may represent the individual 102 in a professional role, with a formal name, the general city name, and a set of professional interests; a third account 104 may represent the individual 102 in a social role, with a familial name, a specific region of the city, and a set of social interests; and a fourth account 104 may represent the individual 102 in a gamer role, with a pseudonym and a set of games that the individual 102 enjoys, but withholding the location of the individual 102 in the interest of privacy.

In order to interact with a particular service 108 in a particular role, the individual 102 may select an account 104 that is associated with the selected role, and may login to the account 104 with the service 108 (e.g., providing login credentials, such as a unique username and password combination, that are associated with the account 104). The service 108 may access the individual profile details 106 of the account 104, and may provide a personalized service using such individual profile details 106. For example, when the individual 102 accesses the commercial service 108 through the student account 104, the service 108 may present a first advertisement 110 that relates to the individual profile details 106 of the student account 104, such as recommending a calculator that is related to the mathematics academic interests of the individual 102; and when the individual 102 accesses the commercial service 108 through the professional account 104, the service 108 may present a second advertisement 110 that relates to the individual profile details 106 of the professional account 104, such as recommending a compiler that is related to the software interests of the individual 102. The individual 102 may continue to access the service 108 through the account 104 that is associated with the selected role, until the individual 102 wishes to interact with a service 108 through a second role. At this time, the individual 102 may logout of the current account 104, and may login to a second account 104 that represents the second role. In this manner, the individual 102 may create and utilize a variety of accounts 104 to interact with the services 108 in various roles.

However, a variety of disadvantages may arise from the representation of the individual 102 according to a variety of accounts 104.

As a first such example, a service 108 may restrict the individual 102 from interaction in the account 104 of a first role while the individual 102 is utilizing the account 104 of a second role. For example, the individual 102 may engage in a transaction with the commercial service in a first account 104, and the service 108 may subsequently deliver a message to the first account 104 relating to the transaction. However, the individual 102 may have logged out of the first account 104 in order to login to a second account 104, and may therefore not receive the message from the service 108.

As a second such example, the individual 102 may be frustrated at having to generate a variety of accounts 104 for the respective roles. For example, if each account 104 utilizes a unique username and password combination, the individual 102 may have to generate and remember a variety of such combinations, and may have difficulty remembering which combination is associated with each account 104, and which role each account 104 represents. Moreover, when the individual 102 provides an update 112 of an account 104, the individual 102 may update the individual profile details 106 of one such account 104 (e.g., updating the city of residence of one account 104), but may fail to update the individual profile details 106 of other accounts 104, thereby leading to the inclusion of outdated information in an account 104 and/or conflicting information in various accounts 104.

As a third such example, the individual 102 may wish to interact with a service 108 concurrently in two roles, such as concurrently communicating through the social network concurrently with a first contact in a student role and a second contact in a social role. However, the service 108 may only permit the individual 102 to login to one account 104 at a time, and the individual 102 may have to access the service 108 alternatively between the respective accounts 104. Moreover, if the individual 102 frequently switches roles, the individual 102 may have to logout of a current account 104 and login to a different account 104 frequently, which may be frustrating for the individual.

As a fourth such example, the individual 102 may wish to access a service 108 through a first account 104, but may accidentally login to a second account 104, and/or may forget to logout of the second account 104 and login to the first account 104. Accordingly, the service 108 may interact with the individual 102 through the wrong account 104. For example, the individual 102 may wish to initiate a transaction with the commercial service 108 in the professional role (e.g., having some equipment shipped to the individual's workplace), but if the individual 102 fails to logout of a personal account 104 and login to the professional account 104, the service 108 may complete the transaction through the individual's personal account 104 (e.g., shipping the equipment to the individual's home address).

As a fifth such example, because a service 108 does not recognize that multiple accounts 104 belonging to the same individual 102, a service that the service 108 seeks to provide to each individual 102 using the service 108 may be redundantly provided for multiple accounts 104. For example, the service 108 may wish to deliver one copy of a particular message about the service 108 to each individual 102, but may inadvertently store four copies of the message in each of the four accounts 104 belonging to the same individual 102, thus inefficiently utilizing the resources of the service 108. Some services 108 may even prohibit individuals 102 from creating and/or using more than one account 108 for any reason, and/or may suspend or ban the individual 102 responsive to detecting the use of multiple accounts 104. Moreover, the individual 102 may successively receive four copies of the same message upon logging into each of the accounts 104. These and other disadvantages may arise from the interaction of the individual 102 with the services 108 in various roles through respective accounts 104.

B. Presented Techniques

Presented herein are techniques for providing a service 108 to an individual 102 in accordance with a current role of the individual 102.

Figure 2:
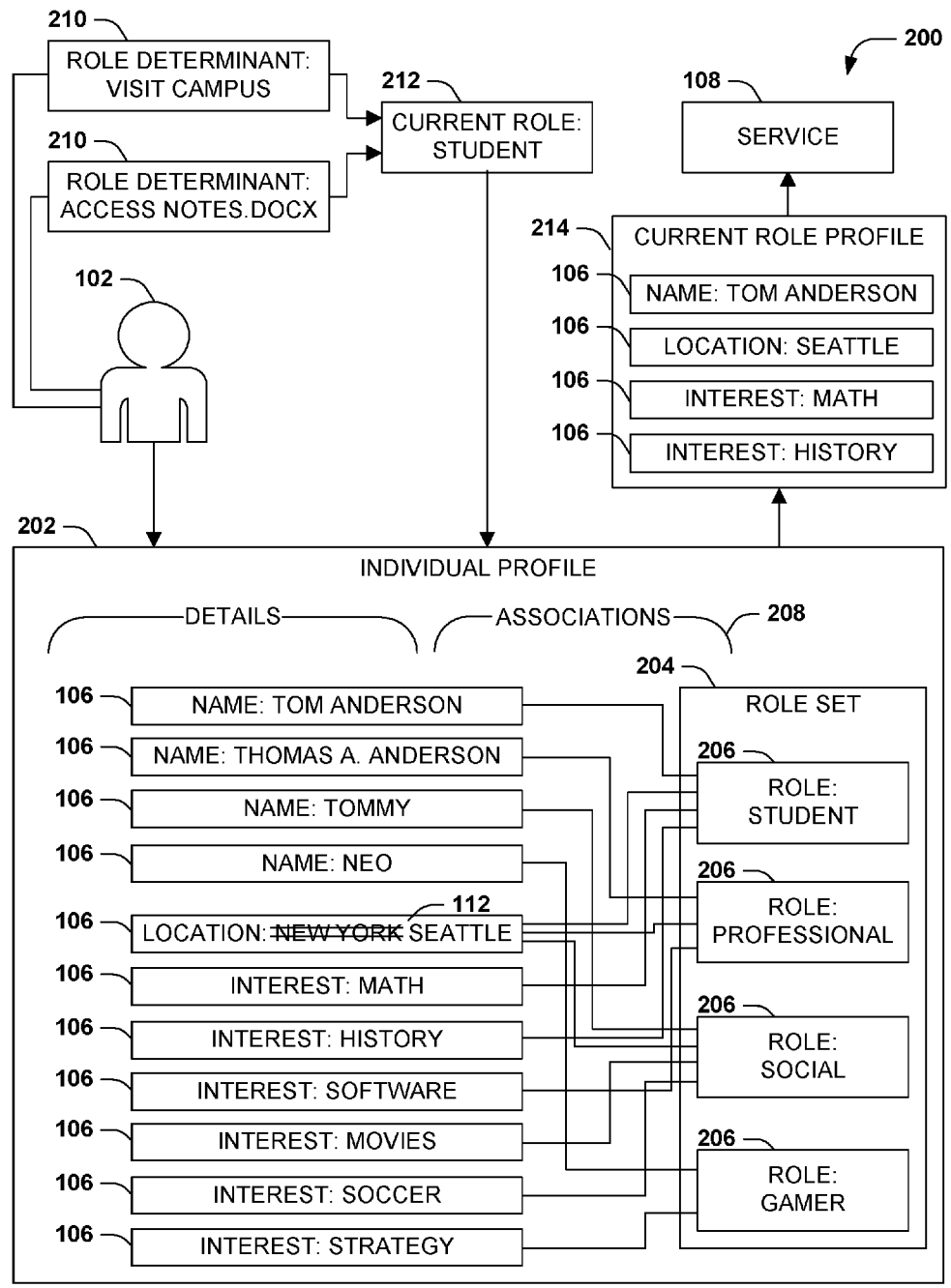
FIG. 2 is an illustration of an example scenario featuring an interaction of an individual with a service according to a current role of the individual, in accordance with the techniques presented herein.

FIG. 2 presents an illustration of an example scenario 200 featuring an individual 102 who interacts with a service 108 in the context of two or more roles 206 of a role set 204, such as a student role, a professional role, a social role, and a gaming role. In this example scenario 200, the individual 102 is represented using an individual profile 202, comprising the individual profile details 106 of each of the roles 206 of the role set 204. For example, the individual profile 202 includes various names that the individual 102 may use in different roles 206, such as a casual name; a formal name; a familial name; and a gaming pseudonym. The individual profile 202 in this example scenario 200 also stores a set of associations 208 between the respective roles 206 of the role set 204 and the individual profile details 106 that are associated with the role 206.

Among the roles 206 of the role set 204, a current role 212 of the individual 102 may be designated as a role 206 in which the individual 102 currently wishes to interact with the service 108. A device of an individual 102 may detect various data that describing the current state of the individual 102, including the individual's actions, such as the applications, components, and functionality of the device(s) that the individual 102 chooses to utilize; the types and content of web pages and messages that the individual 102 chooses to view and/or create; a schedule of the individual 102, such as a personal calendar; the location, destination, route, and mode of travel of the individual 102; the topics that the individual 102 discusses in communication with others; the identities and types of other people with whom the individual 102 chooses to communicate; and the individual's body language or tone of expression.

Using a variety of information sources and sensors, a device 102 may identify that certain pieces of data represent role determinants that provide information about the individual's current role. Role determinants may comprise, e.g., actions performed by the user, such as a gesture, expression, or interaction with a device); details about the user, such as the user's current location or attire; and details about other users or devices that are associated with the user (e.g., the presence of other individuals who have an association with the user, such as the user's colleagues). An evaluation may be performed of one or more such role determinants 210 of the individual 102 that may enable a determination of the intent of the individual 102 to present a current role 212. Among the details of the individual profile, a current role profile may be identified, comprising the subset of details that pertain to the current role and excluding details that do not pertain to the current role. For example, a first role determinant 210 may be detected that the individual 102 is currently at a particular location, such as visiting the campus of the individual's school; and a second role determinant 210 may be detected that the individual 102 is currently accessing a file that comprises the individual's class notes. These role determinants 210 may indicate that the individual 102 is currently participating in the current role 212 of a student.

Responsive to identifying the current role 212 of the individual 102, a current role profile 214 of the individual 102 may be generated as a subset of the individual profile details 106 of the individual profile 202. For example, responsive to detecting that the individual 102 is currently interacting in the current role 212 of a student, the individual profile details 106 having an association 208 with the student role 206 may be selected for inclusion in the current role profile 214, and the individual profile details 106 that do not have an association 208 with the student role 206 may be excluded from the current role profile 214. The current role profile 214 may then be utilized by the service 108 to interact with the individual 102 in accordance with the current role 212 of the individual 102 in accordance with the techniques presented herein.

C. Technical Effects

The use of the techniques presented herein to provide the service 108 to the individual 102 according to the current role 212 of the individual 102 may result in a variety of technical effects.

As a first example of a technical effect that may be achievable by the techniques presented herein, the representation of the individual 102 through an individual profile 202 including the individual profile details 106 for at least two roles 206 of the individual 102 may enable the individual 102 to interact with the service 108 without having to establish multiple accounts 104. Accordingly, the service 108 may understand that the same individual 102 is interacting with the service 108 at different times through a first role 206 and a second role 206, and may refrain from artificially isolating the details of each set of interactions from the individual 102. For example, if the individual 102 initiates transactions with the service 108 through a variety of roles 206, the service 108 may present to the individual 102 a complete set of such transactions, rather than restricting the individual 102 to the transactions initiated through a currently selected account 104.

As a second example of a technical effect that may be achievable by the techniques presented herein, the individual account details 106 may be more easily maintained by the individual 102 for a set of roles 206 than a discrete set of individual profile details 106 for respective accounts 104. As a first such example, the individual 102 does not have to create multiple accounts 104 respectively utilizing a unique username and password combination. As a second such example the individual 102 does not have to enter individual profile details 106 redundantly for several accounts 104. As a third such example, an update 112 to the individual's current residential location may be specified by the individual 102 only once, and may concurrently update several roles 206 that are associated with this individual profile detail 106. Such individual profiles 202 may therefore reduce the incidence of stale and/or conflicting individual profile details 106 among the respective roles 206 of the individual 102.

As a third example of a technical effect that may be achievable by the techniques presented herein, the automatic selection of the current role 212 based on the role determinants 210 of the individual 102 may alleviate the individual 102 of affirmatively logging out of a first account 104 and logging into a second account 104 in order to switch roles 206. Rather, the individual 102 may simply perform actions that are naturally associated with a current role 212, such as traveling to a particular location, interacting with a particular device or resource, or communicating with a particular contact. Such automatic adaptation to the current role 212 of the individual 102 may allow the individual 102 to transition a current computing session seamlessly according to the selection of different current roles 212, rather than having to suspend a first computing session for a first role 120, select or initiate a second computing session for a second role 120, and then reopen applications or documents that the individual 102 was utilizing in the first role 120. A device and/or service may automatically respond by evaluating the role determinants 210 to select a current role 212 that is indicated by the role determinants 210, thereby providing a more adept and less cumbersome user experience for the individual 102. Such automated adaptation may reduce the necessity of repeatedly logging out and into multiple user profiles during a computing session, which may reduce avoidable security risks, such as eavesdropping on entered login credentials. Moreover, such automatic selection of the current role 212 may reduce the incidence of the individual 102 inadvertently interacting with the service 108 in an unintended role.

As a fourth example of a technical effect that may be achievable by the techniques presented herein, the interaction of the individual 102 with the service 108 according to an automated selection of the current role profile 214 for the current role 212 may economize the resources of the service 108 by reducing the creation and/or maintenance of multiple accounts 104 for the same individual 102. As a first such example, rather than storing four complete and distinct accounts 104 for the same individual 102, the service 108 may store only one representation of the individual 102. Such an architecture may therefore utilize the individual profile details 106 of the current role profile 214 utilized by the service 108. As a second such example, in order to interact with the set of individuals 102 who utilizes the service 108, the service 108 may interact with each such individual 102 (e.g., delivering a particular message to the individual 102 only once), rather than redundantly interacting with each of the several accounts 104 representing the same individual 102. Such de-duplication of representations of the individual 102 may therefore facilitate the economy of the resources of the service 108 (e.g., enabling the service 108 to scale to serve a larger number of individuals 102 for a particular set of server hardware), and/or may reduce redundancy in the user experience of the individual 102 (e.g., providing a particular message to the individual 102 only once, instead of once for each account 104 utilized by the individual).

As a fifth example of a technical effect that may be achievable by the techniques presented herein, the interaction of the individual 102 with the service 108 according to an automated selection of the current role profile 214 for the current role 212 may economize the use of the computing resources of the service 108 by reducing the creation and/or maintenance of multiple accounts 104 for the same individual 102. As a first such example, rather than storing four complete and distinct accounts 104 for the same individual 102, the service 108 may store only one representation of the individual 102. Such an architecture may therefore utilize the individual profile details 206 of the current role profile 214 utilized by the service 108. As a second such example, in order to interact with the set of individuals 102 who utilizes the service 108, the service 108 may interact with each such individual 102 (e.g., delivering a particular message to the individual 102 only once), rather than redundantly interacting with each of the several accounts representing the same individual 102. Such de-duplication of representations of the individual 102 may therefore facilitate the economy of the resources of the device 104 (e.g., enabling the service 108 to scale to serve a larger number of individuals 102 for a particular set of device hardware), and/or may reduce redundancy in the user experience of the individual 102 (e.g., providing a particular message to the individual 102 only once, instead of once for each account utilized by the individual). As a second such example, resources of the service 108 (e.g., applications and data stores) that pertain to multiple roles 120 may be shared among such roles 120, rather than compelling the individual 102 to provide duplicate sets of such resources for different accounts that represent the different roles 120 of the individual 102 while interacting with the service 108.

As a sixth example of a technical effect that may be achievable by the techniques presented herein, the adaptation of the service 108 to the current role 212 of the individual 102 may enable efficiency in the operation of the service 108. For example, the service 108 may be able to identify functionality that is not relevant to the current role 212, such as sub-services or options that are appropriate to offer to the individual 102 while interacting with the service 108 in a first role 120 but not in the current role 212 (e.g., offering to present video content to the individual 102 while interacting in a causal or social role, and refraining from offering to present any such video content to the individual 102 while interacting in an academic role such as while the individual 102 is attending a class, or in a professional role such as during work hours). The service 108 may therefore disable functionality and options that are not applicable to the current role 212 of the individual 102, thereby conserving the expenditure of computing resources, such as memory, processor throughput, network capacity, and display space, for functionality that services the current role 212 of the individual 102. Such disabling may also enable the service 108 to present a more suitable user interface to the individual 102, involving content, controls, and functionality that is suitable for the current role 212, while excluding content, controls, and functionality that is unsuitable for the current role 212. These and other technical effects may be achievable through the customization of the service 108 based on the current role profile 214 of the current role 212 of the individual 102 in accordance with the techniques presented herein.

D. Example Embodiments

Figure 3:
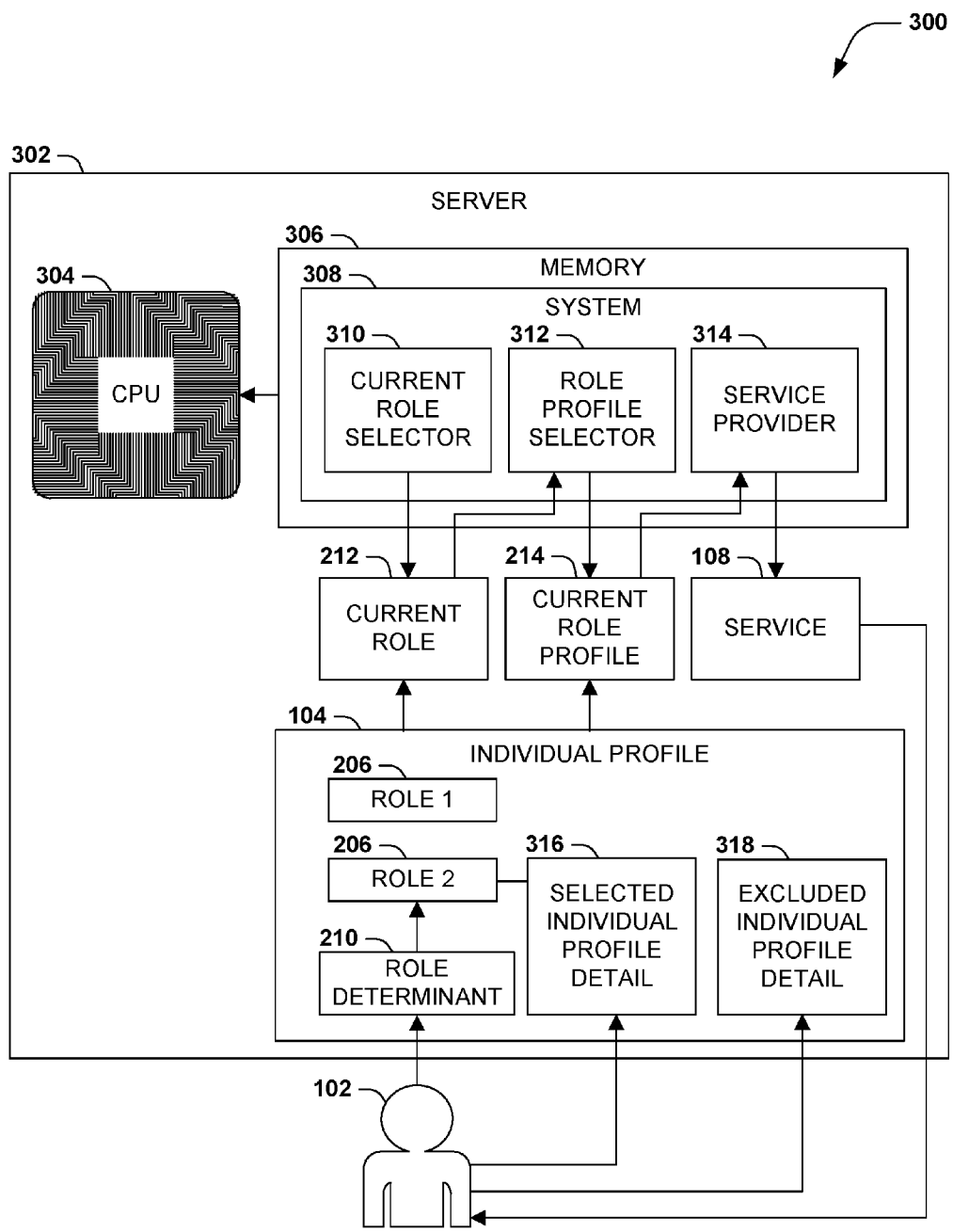
FIG. 3 is a component block diagram of an example system of an example server that provides a service to interact with an individual according to a current role of the individual, accordance with the techniques presented herein.

FIG. 3 presents a third example embodiment of the techniques presented herein, illustrated as an example server 302 featuring a processor 304 and a memory 306 storing an example system 308 that causes the server 302 to provide a service 108 to an individual 102 in view of a current role 212 of the individual 102. The example system 308 may be implemented, e.g., as a set of components respectively comprising a set of instructions stored in the memory 306 of the server 302, where the instructions of respective components, when executed on the processor 304, cause the server 302 to operate in accordance with the techniques presented herein.

The example system 308 includes a current role selector 310, which, responsive to detecting a role determinant 210 of the individual 102, selects, among at least two roles 206 of the individual 102, a current role 212 that is associated with the role determinant 210. The example system 308 also includes a role profile selector 312, which selects, from the individual profile 202, a current role profile 214, comprising at least one selected individual profile detail 316 that is associated with the current role 212, and excluding at least one excluded individual profile detail 318 that is not associated with the current role 212. The example system 308 also includes a service provider 314, which provides the service 108 to the individual 102 according to the current role profile 214 of the individual 102. In this manner, the example system 308 enables the server 302 to provide the service 108 to the individual 102 in accordance with the techniques presented herein.

Figure 4:
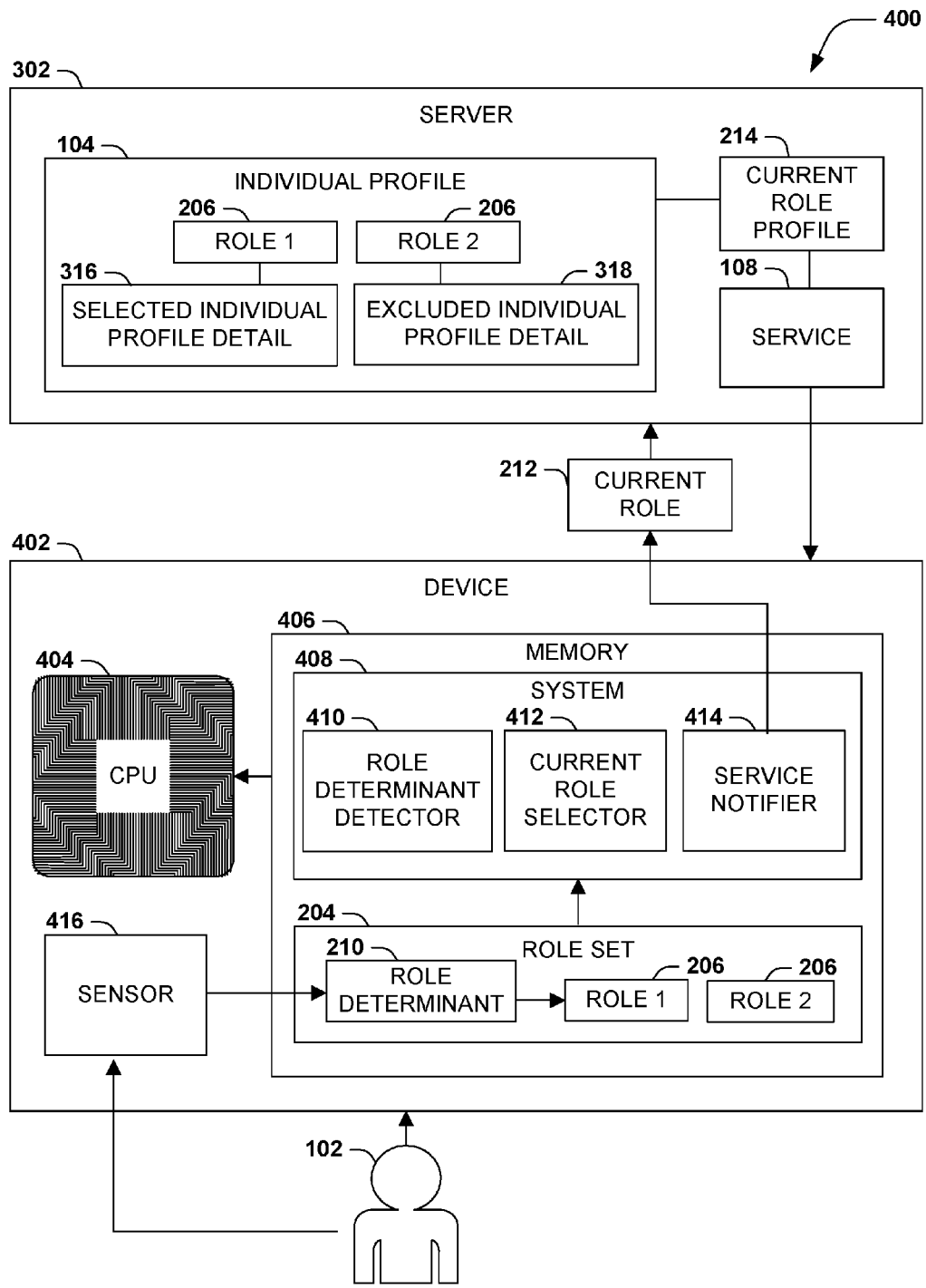
FIG. 4 is a component block diagram of an example device that accesses a service to enable an interaction with an individual according to a current role of the individual, accordance with the techniques presented herein.

FIG. 4 presents a third example embodiment of the techniques presented herein, illustrated as an example device 402 featuring a processor 404; a sensor 416 that detects at least one action of the individual 102; and a memory 406 storing a role set 204, comprising a set of roles 206 that are respectively associated with role determinants 210 that, when detected, indicate that an individual 102 interacting with the device 402 is interacting in a current role 212 of the role set 204. The memory 406 of the device 402 also stores the components of an example system 408 that causes the example device 402 to facilitate a service 108 provided by a server 302 to the individual 102 in view of a current role 212 of the individual 102. Respective components of the example system 408 may be implemented, e.g., as a set of instructions stored in the memory 406 of the server device 402, where the instructions of respective components, when executed on the processor 404, cause the device 402 to operate in accordance with the techniques presented herein.

The example system 408 includes a role determinant detector 410, which correlates the input from the sensor 416 to detect a role determinant 210 that is associated with a role 206 of the role set 204. The example system 406 also comprises a current role selector 310, which, responsive to the role determinant detector 410 detecting a role determinant 210 of the individual 102, selects, among at least two roles 206 of the individual 102, a current role 212 that is associated with the role determinant 210. The example system 408 also includes a service notifier 414, which notifies the service 302 of the current role 212 of the individual 102 according to the detection of the role determinants 210. The example service 302 may utilize the current role 212 to select a current role profile 214 from an individual profile 104 of the individual 102 (e.g., including a selected individual profile detail 316 that is associated with the current role 212, and excluding an excluded individual profile detail 318 that is not associated with the current role 212), and to provide a service 108 to the individual 102 based upon the individual profile details of the current role profile 214. In this manner, the example system 406 of the example device 402 and the example server 302 may interact to provide the service 108 according to the current role 212 to the individual 102, in accordance with the techniques presented herein.

Figure 5:
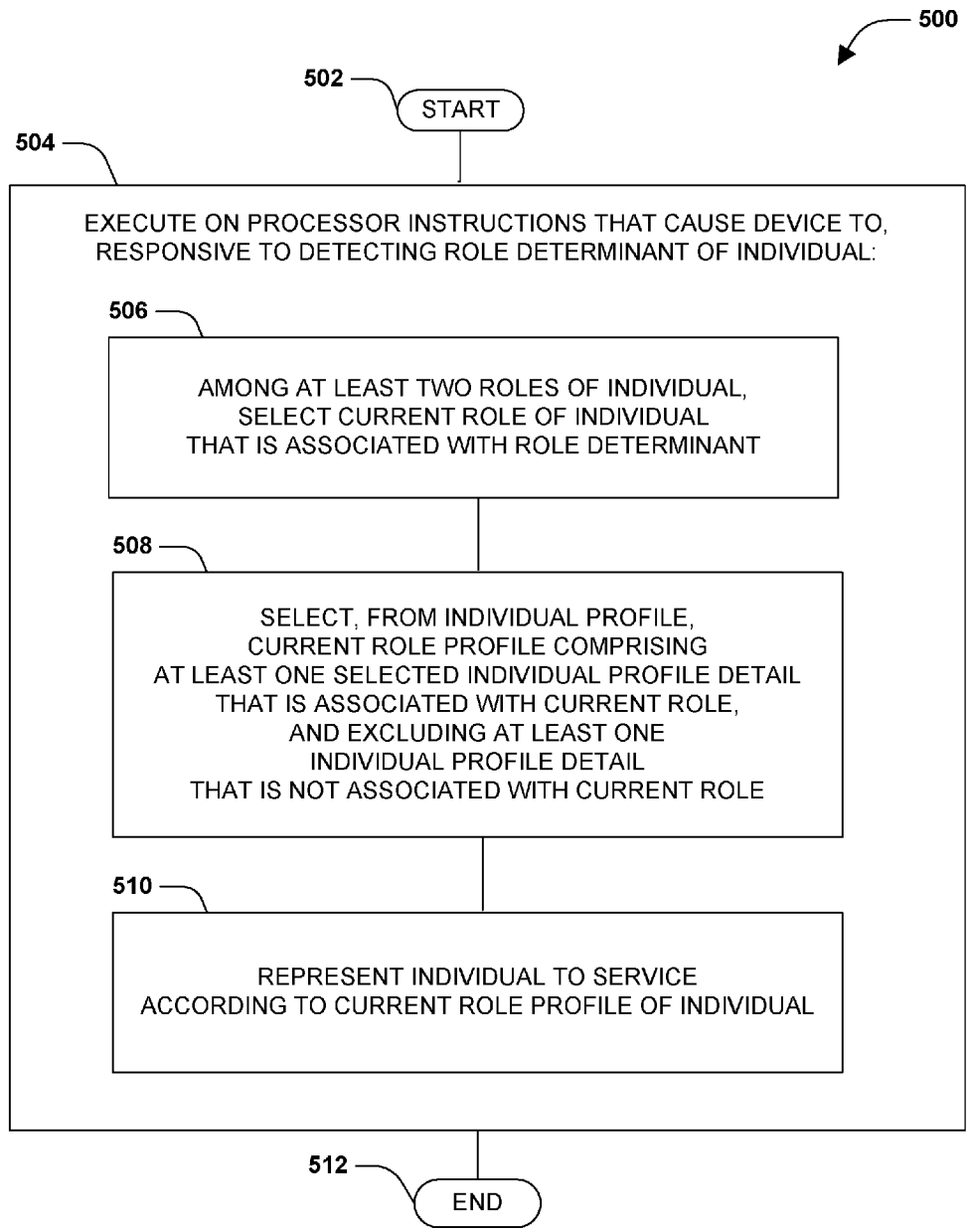
FIG. 5 is a flow diagram of an example method of configuring a device to represent an individual to a service according to a current role of the individual, in accordance with the techniques presented herein.

FIG. 5 presents a third example embodiment of the techniques presented herein, illustrated as an example method 500 of representing an individual 102 having an individual profile 202 to a service 108 in accordance with a current role 212 of the individual 102. The example method 500 may be implemented, e.g., as a set of instructions stored in a memory component of a device, such as a memory circuit, a platter of a hard disk drive, a solid-state storage device, or a magnetic or optical disc, and organized such that, when executed on a processor of the device, cause the device to operate according to the techniques presented herein.

The example method 500 begins at 502 and involves executing 504 the instructions on a processor of the device. Specifically, executing 504 the instructions on the processor causes the device to, among at least two roles 206 of the individual 102, select 506 a current role 212 of the individual 102 that is associated with the role determinant 210. Executing 504 the instructions on the processor further causes the device to select 508, from the individual profile 202, a current role profile 214 comprising at least one selected individual profile detail 106 that is associated with the current role 212, and excluding at least one excluded individual profile detail 106 that is not associated with the current role 212. Executing 504 the instructions on the processor further causes the device to represent 510 the individual 102 to the service 108 according to the current role profile 214 of the individual 102. In this manner, the instructions cause the device to represent the individual 102 to the service 108 according to the current role 212 of the individual 102 in accordance with the techniques presented herein, and so ends at 512.

Figure 6:
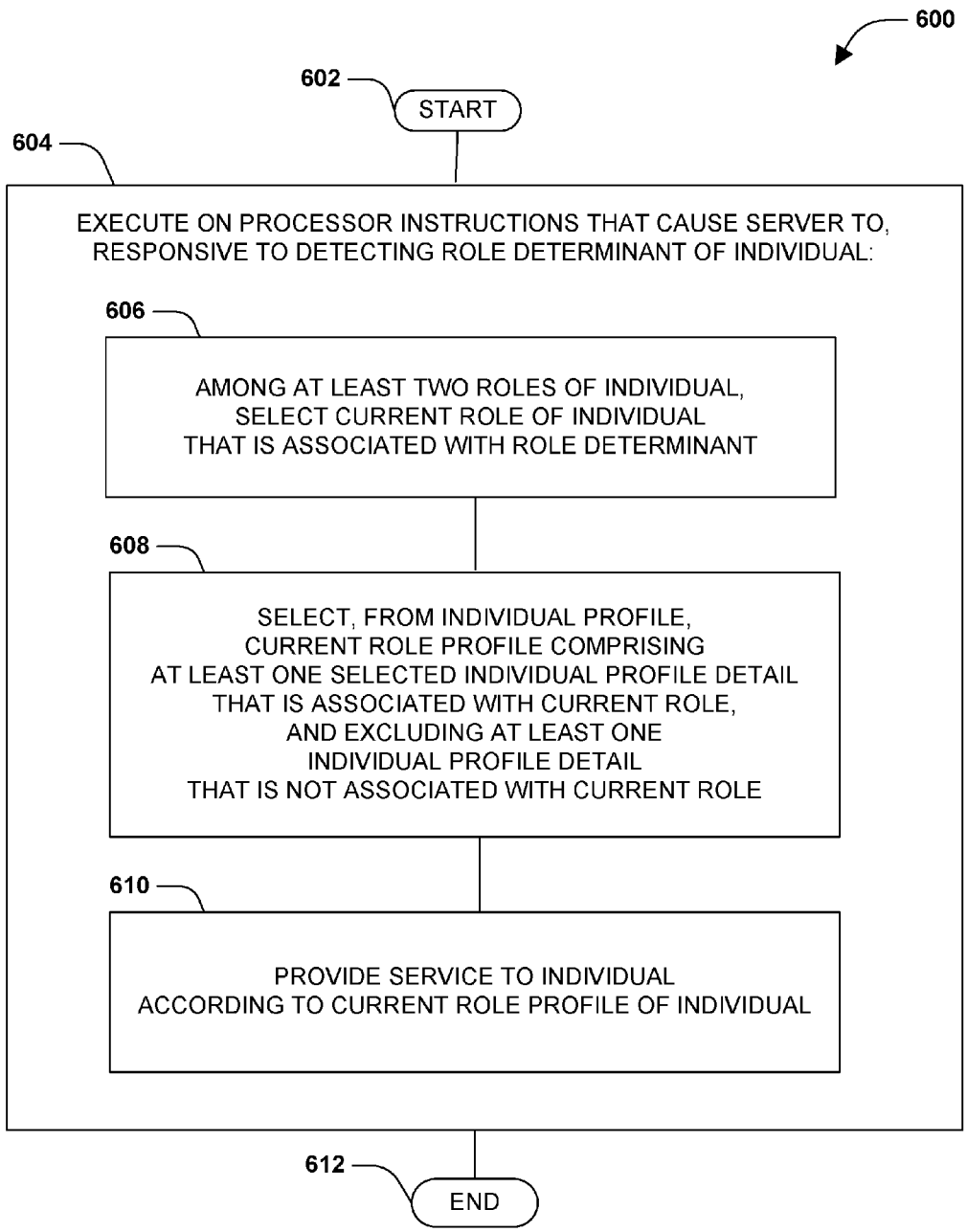
FIG. 6 is a flow diagram of an example method of configuring a service to provide a service to an individual according to a current role of the individual, in accordance with the techniques presented herein.

FIG. 6 presents a fourth example embodiment of the techniques presented herein, illustrated as an example method 600 of enabling a server to provide a service 108 to an individual 102 represented by an individual profile 202, in accordance with a current role 212 of the individual 102. The example method 600 may be implemented, e.g., as a set of instructions stored in a memory component of the server, such as a memory circuit, a platter of a hard disk drive, a solid-state storage device, or a magnetic or optical disc, and organized such that, when executed on a processor of the device, cause the server to operate according to the techniques presented herein.

The example method 600 begins at 602 and involves executing 604 the instructions on a processor of the server. Specifically, executing 604 the instructions on the processor causes the server to, among at least two roles 206 of the individual 102, select 606 a current role 212 of the individual 102 that is associated with the role determinant 210. Executing 604 the instructions on the processor further causes the server to select 608, from the individual profile 202, a current role profile 214 comprising at least one selected individual profile detail 106 that is associated with the current role 212, and excluding at least one excluded individual profile detail 106 that is not associated with the current role 212. Executing 604 the instructions on the processor further causes the server to provide 610 the service 108 to the individual 102 according to the current role profile 214 of the individual 102. In this manner, the instructions cause the server to provide the service 108 to the individual 102 according to the current role 212 of the individual 102, in accordance with the techniques presented herein, and so ends at 612.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 7:
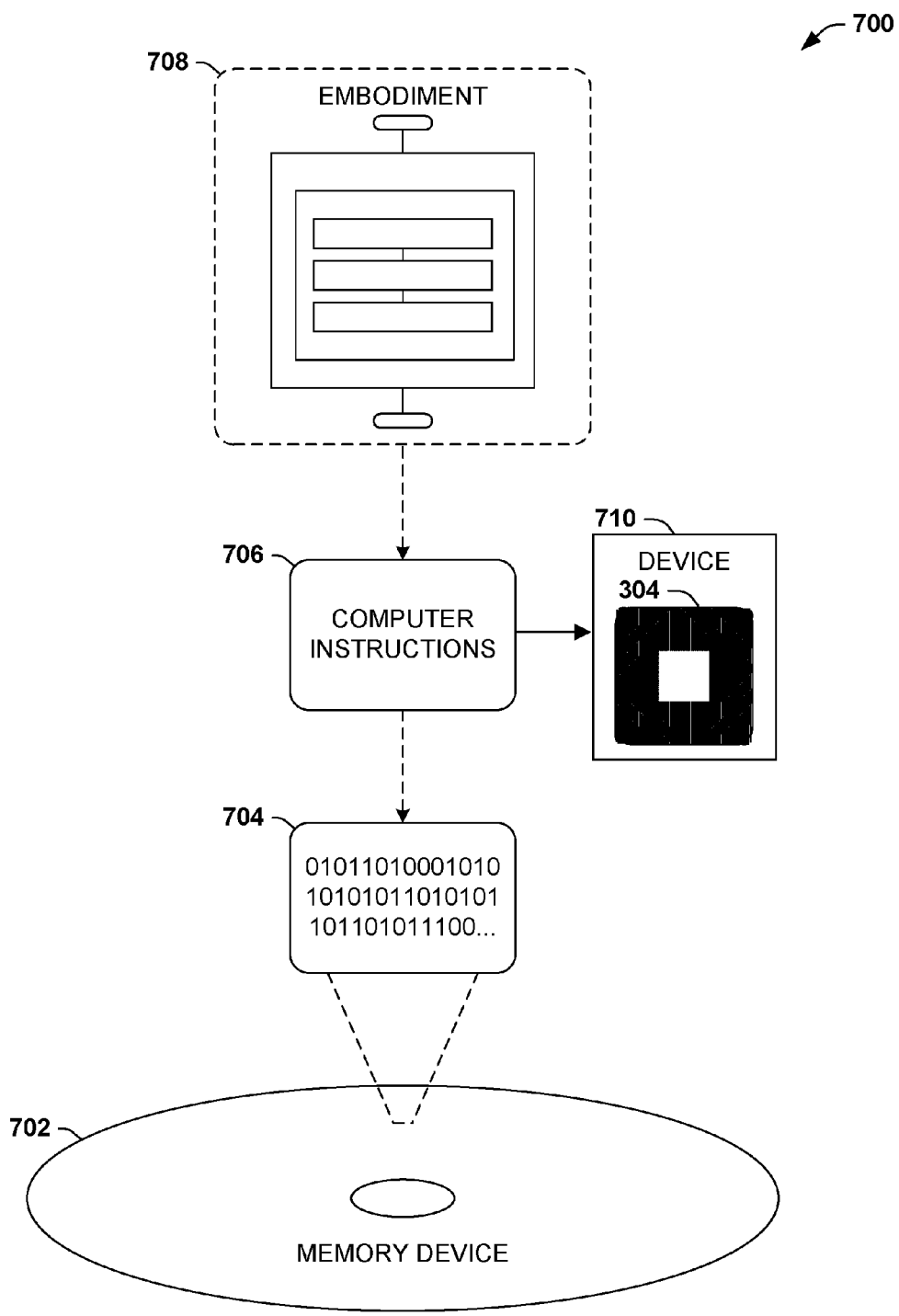
FIG. 7 is an illustration of an example computer-readable medium comprising processor-executable instructions configured to embody one or more of the provisions set forth herein.

An example computer-readable medium that may be devised in these ways is illustrated in FIG. 7, wherein the implementation 700 comprises a computer-readable memory device 702 (e.g., a CD-R, DVD-R, or a platter of a hard disk drive), on which is encoded computer-readable data 704. This computer-readable data 704 in turn comprises a set of computer instructions 606 that, when executed on a processor 304 of a device 710, cause the device 610 to operate according to the principles set forth herein.

In a first such embodiment, the processor-executable instructions 706 may cause a server to implement a system that provides a service 108 with which an individual 102 may interact according to a current role 212 of the individual 102, such as the example server 302 and/or the example system 308 in the example scenario 300 of FIG. 3.

In a second such embodiment, the processor-executable instructions 706 may cause a device to implement a system that facilitates a service 108 in interacting with an individual 102 according to a current role 212 of the individual 102, such as the example device 402 and/or the example system 408 in the example scenario 400 of FIG. 4.

In a third such embodiment, the processor-executable instructions 706 may cause the device 710 to perform a method of representing an individual 102 to a service 108 such that the service 108 to an individual 102 in view of a current role 212 of the individual 102, such as the example method 500 of FIG. 5.

In a fourth such embodiment, the processor-executable instructions 706 may cause the device 710 to perform a method of performing a service 108 to an individual 102 according to the current role 212 of the individual 102, such as the example method 600 of FIG. 6. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example method 400 of FIG. 4; the example system 508 of FIG. 5; and the example memory device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices and servers, such as workstations, laptops, tablets, mobile phones, game consoles, portable gaming devices, portable or non-portable media players, media display devices such as televisions, appliances, home automation devices, computing components integrated with a wearable device integrating such as an eyepiece or a watch, and supervisory control and data acquisition (SCADA) devices.

As a second variation of this first aspect, various architectures may be utilized to implement the techniques presented herein. As a first such example, a single device may provide a complete embodiment of the techniques presented herein, such as a server that stores the individual profile 202; detects a role determinants 210; determines a current role 212 of the individual 102 that is associated with the role determinant 210; selects the current role profile 214 from the individual profile 202 according to the current role 212; and provides the service 108 to the individual 102 utilizing the current role profile 214. As a second such example, various elements of the disclosed techniques may be distributed over two or more devices, such as a user device that detects the role determinant 210 and determines the current role 212 of the individual 102; a first computer storing the individual profile 202 that generates the current role profile 214 from the individual profile 202 according to the current role 212; and a second computer that provides the service 108 to the individual 102 using the current role profile 214. Although arranged as separate devices, the first computer and the second computer may cooperatively operate as a server that provides the service to the individual 102. As a third such example, one or more devices implementing the techniques presented herein may be informed by other devices; e.g., a mobile device implementing the techniques presented herein may identify a role determinant 210 as a gesture that is detected by a wearable device such as a wristwatch, and may provide the current role profile 214 to a server that simply uses the current role profile 214 to provide the service 108 to the individual 102.

As a third variation of this first aspect, the techniques presented herein may be utilized with various types of individual profiles 202, including social networking and social media profiles; academic and/or professional individual profiles; gaming profiles provided for a gaming service; media profiles for individuals 102 producing and/or consuming various types of media; individual behavior profiles of devices that monitor the behavior of the individual 102; governmental profiles of the civic details of various individuals 102; financial profiles of the financial status of various individuals 102; and commercial profiles of the savings and/or purchasing behaviors of various individuals 102.

As a fourth variation of this first aspect, the individual profile 202 may include a large variety of roles 206, such as various types of academic roles (e.g., a student, instructor, teaching assistant, researcher, advisor, or administrator); professional roles (e.g., an applicant, intern, employee, colleague, manager, consultant, or service provider); social roles (e.g., a family member, friend, or acquaintance); and gaming roles (e.g., a competitor, collaborator, and/or organizer). Such roles 206 may also be provided in various levels of detail, such as a general student role, or distinct roles for different classes.

As a fifth variation of this first aspect, the individual profile 202 may be used to provide various types of services 108 on behalf of the individual 102, such as a commercial service; a product, media, or service recommendation service; a social network or referral service; a matchmaking service, such as a dating service or a multiplayer game matchmaking service; an employment service; an information delivery service; and an advising service, such as a financial or career advising service. Many such scenarios may provide a context for utilizing the techniques presented herein.

E2. Role Determinants

A second aspect that may vary among embodiments of the techniques presented herein involves the manner of detecting a role determinant that may indicate the current role 212 of the individual 102, as well as the variety of role determinants 210 that may be detected and utilized in this context.

As a first variation of this second aspect, many types of details and sources of information may be utilized as role determinants 210 to determine the current role 212 of the individual 102. As a first such example, role determinants 210 may include actions of the individual 102, such as the user's gestures, expressions, and interaction with particular devices. As a second such example, role determinants 210.

As a second such example, role determinants 210 may include descriptors of the individual 102, such as the individual's current location or destination; the individual's attire; the individual's possessions, such as a device that is in the individual's hand or pocket; and entries on the individual's calendar. As a third such example, role determinants 210 may include descriptors of the environment of the individual 102, such as other individuals 102 who are in the presence of the individual 102 or who are speaking to the individual 102 (e.g., the individual's family members, friends, or professional colleagues). Many types and sources of information may be utilized as role determinants 210 to determine the current role 212 of the individual 102.

As a second variation of this second aspect, a device and/or service 108 that integrates at least a portion of the techniques presented herein may also determine, as a role determinant 210, the performance of an action by the individual 102. As a first such example, the device and/or service may receive user input from the individual 102 through an input device, such as a keyboard, mouse, or touch-sensitive display, whereby the individual 102 provides an explicit indication by the individual 102 that the individual 102 is interacting in a current role 212. As a second such example, the device may evaluate the interaction of the individual 102 with a computing environment of the device, such as the resources accessed by the individual 102 (e.g., files, media, applications, network-accessible resources such as printers or network-attached storage (NAS) devices, websites, or services 108), including many types of sensors 416 (e.g., cameras, microphones, location sensors, biometric detectors), and may identify such interaction as a role determinant 210. As one such example, the device may associate a first set of files or folders (such as documents relating to a professional project) with the individual's professional role, and a second set of files or folders (such as vacation photographs) with the individual's personal or family role, and may accordingly notify the service 108 of the current role 212 of the individual 102 based on the files or folders that the individual 102 is currently accessing. As a third such example, the device and/or service 108 may evaluate communication by the individual 102 with other individuals, such as messages sent by the individual 102 and/or a voice dialogue engaged by the individual 102, to detect expressions by the individual 102 that are construed as role determinants 210 (e.g., an expression that the individual 102 is currently working, studying, or socially available). For example, a first set of keywords may be associated with the individual's academic role (e.g., "homework," "class," and "project"), and a second set of keywords may be associated with the individual's social role (e.g., "weekend," "soccer," and "party"), and the detection of a significant number of keywords in the individual's conversation or messages may indicate the current role of the individual 102.

As a fourth such example, a device may comprise a wearable device featuring an accelerometer and/or gyroscopic sensor that detects a movement of the individual 102, such as a velocity, acceleration, and/or tilt of the individual 102, which may indicate a gesture performed by the individual while interacting with the device 102 (e.g., shaking the device) and/or incidentally detected by the device 102 (e.g., that the individual 102 is sitting, standing, walking, running, or lying down). For example, an individual may visit an athletic facility both for personal exercise and as a job. When the individual 102 is detected to be running at a jogging pace while located at the athletic facility, the device 104 may select an athletic role for the individual 102; and if the individual 102 is detected to be sitting stationary while located at the athletic facility, the device 104 may select a job role for the individual 102.

As a third variation of this second aspect, the device may comprise an environment sensor that detects an environmental detail pertinent to the individual 102 that indicates a role determinant 210. The device 104 and/or service 108 may infer different roles 120 of the individual 102 based on such environment details (e.g., determining that a location routinely visited by the individual 102 during work hours is the individual's workplace, and is associated with the individual's professional role 120), and/or may be explicitly instructed about such associations by the individual 102 (e.g., the individual may indicate that a particular location or type of activity is associated with a particular role 120). As a first such example, a device and/or service 108 may evaluate the date or time as a role determinant 210 of the individual 102 (e.g., determining whether the current date or time is a weekday, weekend, business hours, evening, late night, and/or holiday). As a second such example, a device and/or service 108 may evaluate metadata about the individual 102 to infer a role determinant 210, such as an appointment on the individual's calendar indicating that the individual 102 is expected to be in class. As a third such example, a device may utilize a microphone to monitor discussion in the vicinity of the individual 102 (e.g., matching a detected voice with a voice print of the individual's teacher to determine that the individual is attending class). As a fourth such example, a service 108 such as a social network may include features that permit the individual 102 to interact with others, such as social contacts, and may monitor such interaction to determine the current role 212 of the individual 102, e.g., according to the relationship between the individual 102 and the other participants in the interaction; the topics of the interaction; and/or the tone of the individual 102 or other participants in engaging in the interaction. As a fourth such example, a device may comprise a global positioning system (GPS) receiver that senses a current location of the individual 102, which may be interpreted as a role determinant 210 due to an association of the location with a current role 212 (e.g., detecting that the individual 102 is present on a school campus). As a fifth such example, a device and/or service may detect other individuals in the proximity of the individual (e.g., a camera may detect the faces of the individual's companions, or a network adapter may detect the proximity of other devices that are known to be carried by other known individuals, or a social network may receive signals from the devices of each of two associated individuals that indicate their concurrent presence in the same location), and may determine the current role 212 according to the identities of the individual's companions. As a sixth such example, a device and/or service 108 may detect a proximity of other devices (e.g., a camera may detect the faces of the individual's companions, or a network adapter may detect the proximity of other devices that are known to be carried by other known individuals), and may determine the current role 212 according to the identities of the individual's companions. As a sixth such example, a device may detect a proximity of other devices (e.g., the availability of a wireless network), and may associate the accessibility of the wireless network with a location that is in turn associated with a current role 212 of the individual 102.

As a fourth variation of this second aspect, a device may receive a notification of a role determinant 210 from a second device. As a first such example, a mobile device, such as a mobile phone, may receive a signal from a wearable sensor, such as a wristwatch or shoe-embedded sensor, that the individual 102 has performed an action, such as a hand gesture or a physical activity. As a second such example, a device may receive a notification from an environmental sensor, such as a presence detector or camera provided in a residence of the individual 102 to detect the individual's actions, and may associate the notification with a role determinant 210. As a third such example, a server may receive a role determinant 210 as a notification from a device of the individual 102, or from a particular service 108 (e.g., a commercial service accessed by the individual 102, which detects that the individual 102 has engaged in a transaction that is associated with a current role 212). Many such role determinants 210 may be detected from many kinds of information in accordance with the techniques presented herein.

E3. Current Role Determination

A third aspect that may vary among embodiments of the techniques presented herein involves the determination of the current role 212 of the individual 102 based on the detection of one or more role determinants 210.

As a first variation of this third aspect, the individual profile 202 may associate the respective roles 206 of the individual 102 with role determinants 210. The device 102 may then determine the current role 212 of the individual 102 by determining which role 206 is associated in the individual profile 202 with a particular role determinant 210. As a first such example, the role determinants 210 may be specified as conditions, and a device may, periodically and/or in response to an event, evaluate the conditions to determine whether any of the role determinants 210 are satisfied, and therefore whether a current role 212 of the individual 102 is to be selected. As a second such example, a device further comprises a trigger that associates a condition with a selected role 206, and may actively monitor the condition to detect a condition fulfillment of the trigger (e.g., a geofencing trigger that is automatically activated when the global positioning service (GPS) receiver of the individual 102 detects that the location of the individual has entered a particular region, such as a school campus), and the device may select, as the current role 212, the selected role associated with the trigger having the condition fulfillment.

Moreover, the determination of the current role 212 may be utilize based upon an evaluation of weighted scores that determine the significance of the respective role determinants 210; e.g., a first location (such as the individual's workplace) may be highly indicative of the current role 212 of the individual 102, while a second location (such as the individual's residence) may be less indicative of the current role 212 of the individual 102. The determination of the current role 212 of the individual 102 according to a weighted evaluation of the role determinants 210 reflecting the degree of indicativeness of the current role 212 may further enable a determination of the confidence of the current role 212 of the individual 102, including a confidence in a combination of roles 206 as the current role 212 of the individual 102 (e.g., an 80% confidence level that the individual 102 is currently operating 75% in a professional role and 25% in an academic role). Additionally, where the weighted comparison of role determinants 210 indicates a borderline determination of confidence (e.g., a poor confidence determination as to which of two roles 206 represents the current role 212 of the individual 102), the individual may be prompted (currently or retroactively) to clarify by selecting one of the potential roles 206. As another example, a device may continue to monitor the role determinants 210 to detect further information that strengthens the confidence of a particular role 206, and may refrain from altering the current role 212 until the confidence exceeds a confidence threshold. Additionally, such clarification may be utilized to adjust the weights of the role determinants 210 to enable a more accurate determination of the current role 212 of the individual 102 in similar circumstances in the future.

As a second variation of this third aspect, alternatively or additionally to the individual profile 202 indicating the role determinants 210 associated with respective roles 206, a device may evaluate the set of role determinants 210 in an ad hoc manner in order to determine the current role 212 of the individual 102. As a first such example, a device may compare various role determinants 210 with available sources of information to determine the roles 206 respectively associated therewith (e.g., comparing a current location of the individual 102 with a location database to determine the location type of the current location, such as determining that the individual 102 is located in a school building and is therefore likely interacting in a student role 206, or determining that the individual 102 is located at a restaurant and is therefore likely interacting in a social role 206). Further clarification of the current role 212 may be determined, e.g., by identifying companions of the individual 102 in order to determine whether the meeting is a social role 120 (e.g., when the individual 102 is accompanied by friends) or a professional role 120 (e.g., when the individual 102 is accompanied by professional colleagues). As a second such example, a device may report role determinants 210 to a role determining service, which may evaluate various facts about the individual 102 and various environmental properties in order to determine the current role 212 of the individual 102.

As a third variation of this third aspect, various techniques may be utilized to determine the current role 212 of the individual 102 in view of ambiguous, and potentially conflicting, role determinants 210. Because some individuals 102 may frequently and fluidly switch among a significant set of roles 206, it may occasionally be difficult to determine the current role 212 of the individual 102. As a first such example, a particular location may be associated with two or more roles 206 (e.g., an individual 102 may visit a library either to study in a student role 206, or to select books and other media for casual consumption in a social role 206), and techniques may be utilized to determine which of several roles 206 is indicated by a detected role determinant 210. For example, the device 104 and/or service 108 may determine whether the individual 102 tacitly accepts the current role 212 determined by the device 104, or whether the individual 102 responds by selecting a different current role 212 that indicates an adjustment of the determination. Additionally, the device 104 may continue to evaluate role determinants in order to verify the determination of the current role 212 (e.g., additional information that is consistent with the current role 212) or to contradict the current role 212 (e.g., additional information that conflicts with the selection of the current role 212).

As a second such example, different role determinants 210 may identify conflicting roles 206; e.g., the individual 102 may be located in a location that is associated with a first role 206, but may be using a mobile device to communicate with another individual who is associated with a second role 206. An embodiment may utilize a variety of techniques to determine which role 206 represents the current role 212 of the individual 102, and whether such roles 206 are mutually exclusive or complementary in this regard. For example, the device 104 may determine whether the individual 102 tacitly accepts the current role 212 determined by the device 104, or whether the individual 102 responds by selecting a different current role 212 that indicates an adjustment of the determination. Additionally, the device 104 may continue to evaluate role determinants in order to verify the determination of the current role 212 (e.g., additional information that is consistent with the current role 212) or to contradict the current role 212 (e.g., additional information that conflicts with the selection of the current role 212).

Figure 8:
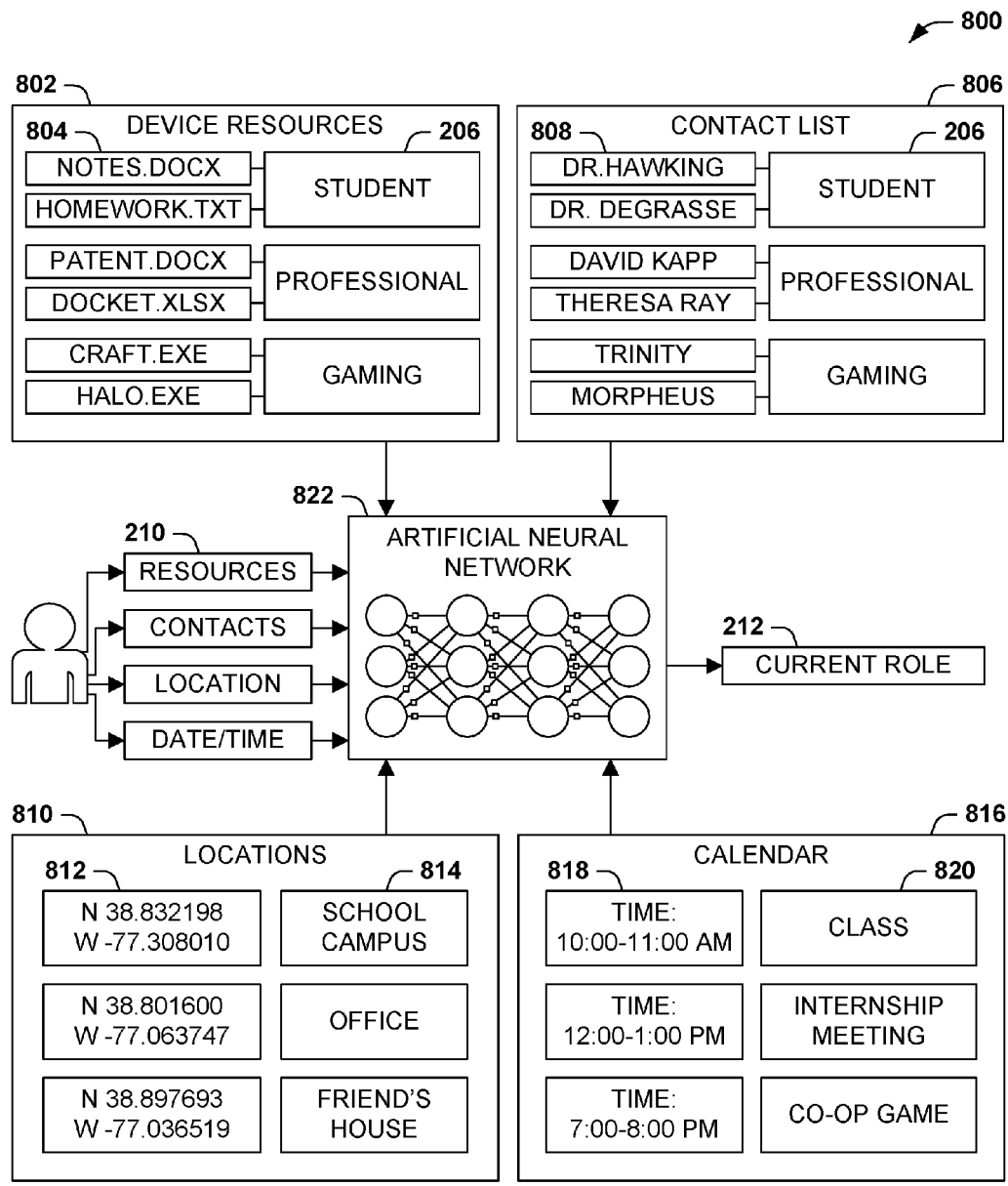
FIG. 8 is an illustration of an example scenario featuring a determination of a current role of an individual, in accordance with the techniques presented herein.

FIG. 8 presents an illustration of an example scenario 800 featuring an example of this third variation of this third aspect, wherein various sources of information provide role determinants 210 are available to determine the current role 212 of the individual 102. As a first such example, a set of device resources 802 may be provided on a device, such as files 804 that respectively represent content that may be associated with various roles 206 (e.g., class notes and homework assignments for a student role 206; task lists and projects for a professional role 206; and gaming applications for a gaming role 206). As a second such example, a contact list 806 may include a variety of contacts 808 that may be associated with a variety of roles 206 (e.g., instructors who interact with the individual 102 in a student role; colleagues of an organization who interact with the individual 102 in a professional role; and teammates who interact with the individual 102 in a gaming role). Alternatively or additionally, the device may convey the availability of the contacts 808 in other ways than making the contacts 808 available or unavailable. For example, the contacts 808 may be sorted to present those associated with the current role 212 of the individual 102 before other contacts; may be rearranged as a hierarchical menu that presents the contacts 808 associated with the current role 212, and an "Other Contacts" option that expands to show the other contacts 808; and/or differentially highlighted to draw attention to the contacts 808 that are associated with the current role 212 of the individual 102. As a third such example, a location set 810 may comprise a set of coordinate sets (e.g., geospatial coordinates defining the boundaries of a region) that define a location 814 that, in turn, are associated with a role 206 (e.g., a school campus location 814 that the individual 102 visits in a student role 206; an office location 814 that the individual 102 visits in a professional role 206; and a friend's house location 814 that the individual 102 visits in a social role 206). As a fourth such example, a calendar 816 may include a set of dates and times 818 during which the individual 102 is anticipated to have an appointment 820 that is associated with a role 206 (e.g., a class appointment 820 that the individual 102 attends in a student role 206; a meeting appointment 820 that the individual 102 attends in a professional role 206; and a scheduled game appointment 820 that the individual 102 attends in a gaming role 206).

As further illustrated in this example scenario 800, at a particular time, a device may determine that, among these various sources of information, a particular set of role determinants 210 may variously describe the current role 212 of the individual 102. Some role determinants 210 may conflict, while other role determinants 210 may be associated with two or more roles 206. A learning algorithm, such as an artificial neural network 822, may be provided to determine, among a set of role determinants 210, the current role 212 of the individual 102. For example, in a supervised learning model, the artificial neural network 822 may actively monitor the role determinants 210 and may receive guidance from a human trainer, including the individual 102, about the current role 212 of the individual 102, that is associated with various role determinants 210. Alternatively or additionally, the device 104 and/or service 108 may compare the selection of a current role 212 based on a set of role determinants 210 with a set of training data, such as annotated exemplary data that indicates the current role 212 that is to be correctly selected in response to particular sets of role determinants 210. The device 104. The device 104 and/or service 108 may incrementally adjust the neuron weights of respective input and intermediate nodes of the artificial neural network 822 in order to reflect the significance of the respective role determinants 210 in signaling each role 206 as the current role 212 of the individual 102 (e.g., determining that a "library" location is highly indicative of the student role 206 of the individual 102; marginally indicative of a social role 206 of the individual 102; and not indicative, or even contraindicative, of a professional role 206 of the individual 102).

The training of the artificial neural network 822 may continue until the artificial neural network 822 is capable of consistently identifying the correct current role 212 of the individual 102 within a desired degree of confidence. The artificial neural network 822 may then be invoked to determine, among a set of role determinants 210 that currently describe the individual 102, the current role 212 that presents the highest correlation with the role determinants 210. The artificial neural network 822 may further be trained through feedback; e.g., if the individual 102 indicates that the artificial neural network 822 has incorrectly selected a first role 206 as the current role 212 rather than a second role 206, the artificial neural network 822 may adjust the neural weights of the role determinants 210 to promote the future selection of the second role 206 rather than the first role 206 in response to such role determinants. Many such learning algorithms and combinations thereof may be utilized in this capacity, such as genetic algorithms and Bayesian classification algorithms, and/or many types of supervised and unsupervised training methodologies (e.g., artificial Turk training methodologies) to achieve the configuration of the learning algorithms to identify the current role 212 in accordance with the techniques presented herein.

As a fourth variation of this third aspect, an embodiment may provisionally select a current role 212 of the individual 102, and may continue to monitor the role determinants 210 of the individual 102 for confirmation. As a first such example, an embodiment may ask the individual 102 to confirm a transition from a previous current role 212 to a new current role 212. As a second such example, an embodiment may remind the individual 102 that it is time to transition to a new current role 212 (e.g., based on the time and/or an interaction with another individual, prompting the individual 102 to transition to a student current role 212). For example, a service 108 may transmit to a device 104 a notification of the new current role 212, and the device 104 may present the notification to the individual 102 as a visual and/or audial presentation (e.g., a whispered reminder inserted into a telephone conversation), and/or may offer a vibrational alert that signals the role transition to the individual 102. The individual 102 may confirm, refuse, and/or correct the suggestion of the new current role 212, and the device 104 may adapt the current role 212, as well as the determination process for selecting the current role 212, according to the response of the individual 102. The device 104 may also send such information to the service 108 to update the service 108 as to the current role 212 of the individual 102, and/or to update the association of role determinants and roles 120 in order to provide more accurate determination of the current role 212 of the individual 102.

As a fifth variation of this third aspect, some roles 206 of an individual may be mutually exclusive, such that transitioning to a new current role 212 also involves transitioning out of a previous current role 212. Additionally, if an ambiguity exists among a set of roles 206, an embodiment may prompt the individual 102 to indicate which of the mutually exclusive roles 206 to select as the current role 212. Alternatively, the embodiment may forgo selecting either role 206 as the current role 212 until continued monitoring of the role determinants 210 of the individual 102 indicates the role 206 to select as the current role 212.

As a sixth variation of this third aspect, some roles 206 may be compatible and/or complementary, and an individual 102 may concurrently interact in two or more roles 206, such as while interacting with a contact 808 comprising an instructor who both teaches the individual's class and a supervisor of an internship of the individual 102 (thus prompting a concurrent selection of the student role 206 and the professional role 206), or while interacting with a contact 808 who is both a fellow student in the same class as the individual 102 and also a friend of the individual 102 (thus prompting a concurrent selection of the student role 206 and the social role 206). In such scenarios, in addition to the selection of a current role profile 214 for a current role 212, an embodiment may detect a second role determinant 210 of a second role 206 that is typically associated with a second role profile 214 comprising a second individual profile detail 106 that is not included in the current role profile 214 of the current role 212. Accordingly, the embodiment may add the second role 206 to the current role 212 of the individual 102, and may add the second individual profile detail 106 of the second role profile 214 to the current role profile 214 of the individual 102, such that the current role profile 214 comprises a superset of the individual profile details 106 associated with the current role 212 and the individual profile details 106 associated with the second role 206. Additionally, a conflict among the individual profile details 106 of two concurrently selected current roles 212 may be resolved in a variety of ways (e.g., if a first role 212 includes the given name of the individual 102 and the second role 212 includes a pseudonym used by the individual 102 in the interest of privacy, the pseudonym may be selected as having priority over the given name of the individual 102).

As a seventh variation of this third aspect, responsive to detecting a new role determinant 210 that is not associated with a role 206, an embodiment may endeavor to determine which of the roles 206 is to be associated with the role determinant 210. For example, if the individual 102 is speaking with a previously unknown contact 808, an embodiment may endeavor to associate the unknown contact 808 with a second contact 808 who is associated with a role 206 of the individual 102, and/or may associate the unknown contact 808 with the current role 206 that is indicated by other role determinants 210; e.g., if a device first detects a communication between the individual 102 and an unknown contact 808 in an office, the device may associate the unknown contact 808 with the professional role 206 that is indicated by the location, and may consider further interaction with the unknown contact 808 to involve the professional role 206 of the individual 102 even if such further contact occurs away from the office. Moreover, such role determinants 210 may be monitored to determine a consistency among the associations of the role determinants 210 and the roles 206. Such continued monitoring may enable an adjustment of such associations in response to changing roles 206 over time; e.g., a contact 808 who the individual 102 first encounters in a classroom may initially be associated with a student role 206, but if the individual 102 consistently encounters the contact 808 thereafter in an office location, the embodiment may alter the evaluation of the contact 808 to a role determinant of a professional role 206.

Figure 9:
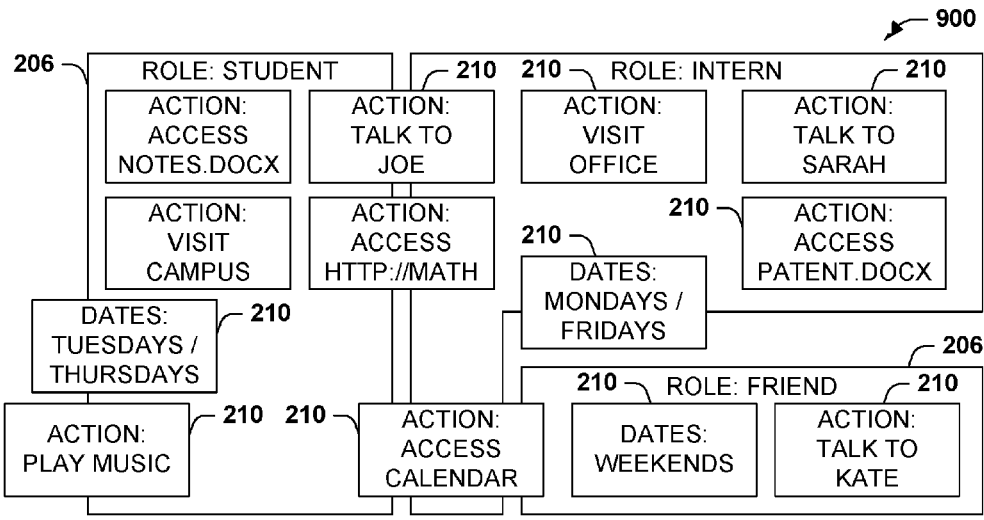
FIG. 9 is an illustration of an example scenario featuring an identification of role determinants respectively associated with the roles of an individual, in accordance with the techniques presented herein.

FIG. 9 presents an illustration of an example scenario 900 featuring one such technique for associating role determinants 210 with roles 206. In this example scenario 900, a clustering technique is utilized, wherein an embodiment determines the correlation of each role determinant 210 with one or more other roles 206. Some role determinants 210 may overlap two or more roles 206, while other role determinants 210 may be ambiguous (e.g., may be only occasionally associated with a particular role 206, and partly not determining such a particular role 206, such as activities that the individual 102 performs during idle periods). A newly detected role determinant 210 may fit into the clustering (e.g., by positioning the role determinant 210 closer to correlated role determinants 210, and may lower the probability of selecting a role 120 for uncorrelated role determinants 210, and and may lower the probability of selecting a role 120 still further for anticorrelated role determinants 210), and may therefore be associated with a role 206 of correlationally proximate role determinants 210 that appear mutually exclusive with a particular role 120. In this manner, the device and/or service 108 may raise the accuracy of the association of roles 120 with role determinants 210 that are frequently detected as co-occurring during the selection of the role 120 as the current role 212 of the individual 102.

As an eighth variation of this third aspect, in addition to the automated selection of the current role 212 of the individual 102, embodiments may involve the participation of the individual 102 in such selection. As a first such example, a device and/or service 108 may allow the individual 102 to specify a transition to a current role 212 explicitly, such as in a drop-down list of available roles, and may transition to the role selected by the individual 102. As a second such example, a device and/or service 108 may confirm the selection of the current role 212 with the individual 102, e.g., by presenting a prompt or notification informing the individual 102 of the selection, presenting the basis for the selection (e.g., the role determinants 210 involved in such selection), and/or soliciting the individual 102 to confirm the selection of the current role 212.

Still further variations of this third aspect, additional techniques may be utilized, alone or in combination with the other techniques provided herein, to inform the detection of role determinants 210 and the association of the role 120 of the individual 102 indicated thereby. As a first such example, a variety of data mining and information extraction techniques may be applied to a rich set of data describing the individual 102, including the individual's social profile; the individual's use of various services, such as the individual's recent purchase and travel history; and the details of people, objects, and events that relate to the user. As another example, online learning techniques may be applied to extrapolate associations between role determinants 210 of various users (e.g., the members of a social network or population, or specifically the user's social group) and the roles 120 indicated by such role determinants 210. For example, behavioral analysis may be applied to determine that individuals 102 often consume caffeinated beverages when engaged in a professional or student role, and alcoholic beverages when engaged in a social or casual role. These determinations from an online population may be applied to determine the association of a role determinant 210 for a particular individual 102 with a particular role 120, particularly if the role determinant 210 has not previously been evaluated with respect to the individual 102, or if the other role determinants 210 of the individual 102 create conflicting determinations about the current role 212 of the individual 102 that may be resolvable based on online learning or other information extraction techniques. Such techniques may be utilized prior to the determination (e.g., as a default or stock base of associations between role determinants 210 and roles 120), and/or on an ad hoc basis (e.g., when a new role determinant 210 is detected, or is determined to be ambiguous with respect to the current role 212 of the individual 102). Many such techniques may be utilized to determine the current role 212 of an individual in view of the detection of role determinants 210 in accordance with the techniques presented herein.

E4. Choosing Current Role Profile

A fourth aspect that may vary among embodiments of the techniques presented herein involves the selection, from among the individual profile details 106 of the individual profile 202, a subset of individual profile details 106 comprising a current role profile 214 for a current role 212 (e.g., including a selected individual profile detail 516, and excluding an excluded individual profile detail 518 that does not relate to the current role 212 of the individual 102).

As a first variation of this fourth aspect, the individual 102 may specify the selected individual profile details 516 to be included in the respective roles 206. That is, the individual 102 may generate and/or curate the current role profile 214, such as the image and persona projected for the individual 102 while interacting in various roles 206. Such generation and/or curation may be expressly directed by the individual 102 to an embodiment (e.g., as a request to use a particular name for the individual 102 while interacting in a particular role 206), and/or may be detected by observing the actions of the individual 102 (e.g., detecting that while interacting in a particular role 206, the individual 102 often utilizes a particular name).

As a second variation of this fourth aspect, a current role profile 214 for a particular role 206 may be generated and stored, such that a subsequent selection of the role 206 as the current role 212 may enable a selection of the previously stored current role profile 214. A stored current role profile 214 may be periodically updated (e.g., regenerating the current role profile 214 for a role 206 on an hourly basis) and/or in response to adjustments of the individual profile 202; e.g., the device and/or service 108 may periodically query a social network for updates to the individual profile details 206 of the social profile of the individual 102, and may automatically categorize such individual profile details 206 to produce the current role profile 214. Such regeneration may facilitate the freshness of the current role profile 214, such as steadily diminishing the significance of contacts 808 and interests with which the individual 102 no longer participates, and actively including new interests of the individual 102 based on recent changes to the roles 120 of the individual 102. Alternatively, the current role profile

214 for a particular role 206 may be composited responsive to selection as the current role 212. For example, a device and/or service 108 may determine, on an ad hoc basis, which individual profile details 106 are to be used to represent the individual 102 in the current role 212, such as by querying a social network from which an individual profile detail 206 has been retrieved with an inquiry about the role 120 associated with the individual profile detail 206; by associating a newly detected role determinant 210 with the current role 212 of the individual 102 when such role determinant 210 was detected or performed; and/or by asking the individual 102 to specify the role 120 associated with an individual profile detail 206 when automated association is ambiguous As a third variation of this fourth aspect, the roles 206 of an individual 102 may be specified in a hierarchical manner in order to provide varying levels of detail, which may enable sophistication in the selection of individual profile details 106 to include in the current role profile 214 in different circumstances. For example, rather than establishing a single current role profile 214 for a social role 206 that the individual 102 utilizes with all social contacts 808, an embodiment may identify a hierarchy of social roles 206 (e.g., different identities that the individual 102 exhibits or wishes to exhibit among different subsets of contacts 808). For instance, the individual 102 may choose to share one set of individual profile details 106 as the current role profile 214 while interacting only with a close friend, but may choose to reserve some such individual profile details 106 while interacting with the close friend in the presence of less personal friends and/or mutual acquaintances.

Moreover, individual profiles 202 structured as a hierarchy of roles 206 may be interpreted in a variety of ways. As a first such example, the individual profile 202 may include a base profile, comprising at least one base individual profile detail 108 that is included in the current role profiles 214 of all of the roles 206 (e.g., an interest in mathematics, a religious belief, or a dietary or health condition that the individual 102 wishes to express in every role 206). As a second such example, the individual profile details 106 of a hierarchically subordinate role 206 may supplement the current role profile 214 of a hierarchically superior role 206, such as a high-priority individual profile detail 108 that is to take precedence over other individual profile details 108 (e.g., the individual profile details 108 that relate to the individual's family may supersede any conflicting individual profile details 108 in other individual profiles 202). As a third such example, a first individual profile detail 106 in a hierarchically subordinate role 206 may supersede a second individual profile detail 106 in a hierarchically superior role 206; e.g., an individual 102 may indicate that a particular individual profile detail 106 is to be withheld while interacting with a particular set of contacts 808 in the interest of anonymity and/or privacy, even if the individual profile detail 106 is to be included in the current role profile 214 of a more general role 206. In these and other ways, an individual profile 202 structured as a set of hierarchically structured roles 206 may reflect the subtleties of such interactions and current role profiles 214 associated therewith.

Figure 10:
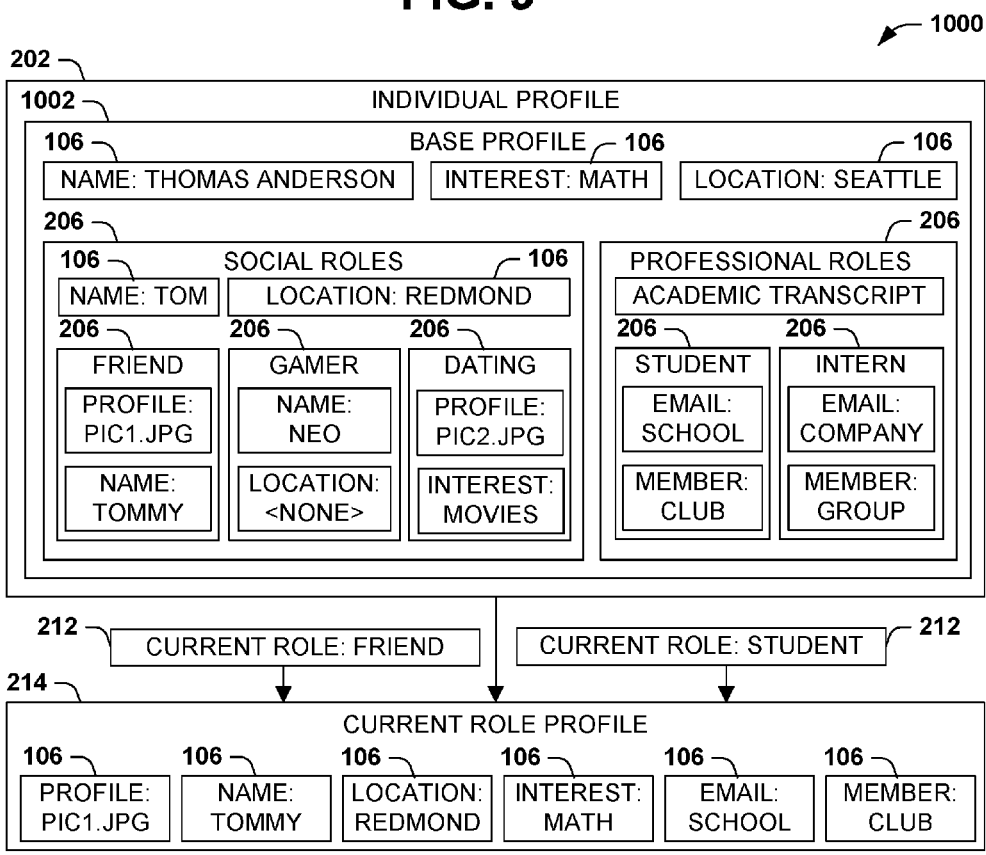
FIG. 10 is an illustration of an example scenario featuring an individual profile representing an individual according to a set of roles, in accordance with the techniques presented herein.

FIG. 10 presents an illustration of an example scenario 1000 featuring an individual profile 202 that is structured hierarchically in accordance with this third variation of this fourth aspect. In this example scenario 1000, the individual profile 202 includes a base profile 1002 that features individual profile details 106 to be used by default, such as the formal name of the individual 102 and a regional location of residence (e.g., the city where the individual 102 resides). A set of social roles 206 may be provided that supersede the name of the individual 102 with the individual's familiar name and a more specific location (e.g., the particular neighborhood of the city); and within the social roles 206, more specific sets of individual profile details 106 may be specified for more specific social roles 206, such as a first profile picture to be used while the individual 102 is in a friendly social role 206, and a second profile picture to be used while the individual 102 is in a dating social role 206. Moreover, some roles 206 may indicate a withholding of individual profile details 106 that are included in the broader social context; e.g., while interacting in a gaming social role, the individual 102 may utilize a pseudonym and may withhold the individual's city of residence in the interest of privacy. A second set of roles 206 may be provided for social roles 206, such as a student role 206 and a professional intern role 206. The individual profile 104 may be used to generate the current role profile 214, and may even inform the generation of such a profile for concurrently selected current roles 212, such as specifying whether particular individual profile details are to be included when generating a current role profile 214 for a current role 212 (e.g., the individual profile 104 may indicate that a particular individual profile detail is sensitive to the individual 102, and is to be included in the current role profile 214 only in trusted circumstances, such as when the individual 102 is in a family role at home). As another example, if the individual 102 is interacting with a contact 808 who is both a fellow student (such that a scholastic role 120 may be selected as the current role 212) and a friend (such that a social role 120 may be selected as the current role 212), the current role profile 214 may be generated as an aggregation of the individual profile details 106 associated with each role 206.

As a fourth variation of this fourth aspect, a current role profile template may be utilized to generate the current role profile 214 for a current role 212 from the individual profile 202. For example, a social profile template may specify that the individual's current location is to be included whenever a social role 206 is selected as the current role 212. As one such example, a current role profile template may be generated based on an evaluation of the current role profiles 214 of a number of individuals 102 (e.g., determining, among a social network, which individual profile details 106 the individuals 102 frequently choose to share as part of a current role profile 214, and which individual profile details 106 the individuals 102 choose to reserve as private). In some scenarios, a learning algorithm may be utilized to determine such details, based upon, e.g., a classification of the individual 102 with other individuals 102 of a particular culture, community, or geographic region.

As a further example of this fourth variation of this fourth aspect, an embodiment may present to the individual 102 a role catalog, comprising at least one role template for a suggested role 106 of the individual 102. For example, when an individual 102 joins a service 108 such as a social network, the service 108 may provide to the individual 102 a role catalog of role templates that the individual 102 may choose to represents his or her identity and persona within the social network (e.g., a low-privacy role template that includes all but the most sensitive individual profile details 106 of the individual profile 202 in the current role profile 214 for the social role 206, and a high-privacy role template that includes only basic individual profile details 106 of the individual profile 202 in the current role profile 214 for the social role 206). Responsive to receiving a selection of a selected role template from the individual 102, an embodiment may add the suggested role 206 of the selected role template to the roles 206 of the individual 102, and store the selected role template. Thereafter, when the suggested role is selected as the current role 212, the selected role template for the suggested role 206 may be applied to the individual profile 102 to select the current role profile 214.

Figure 11:
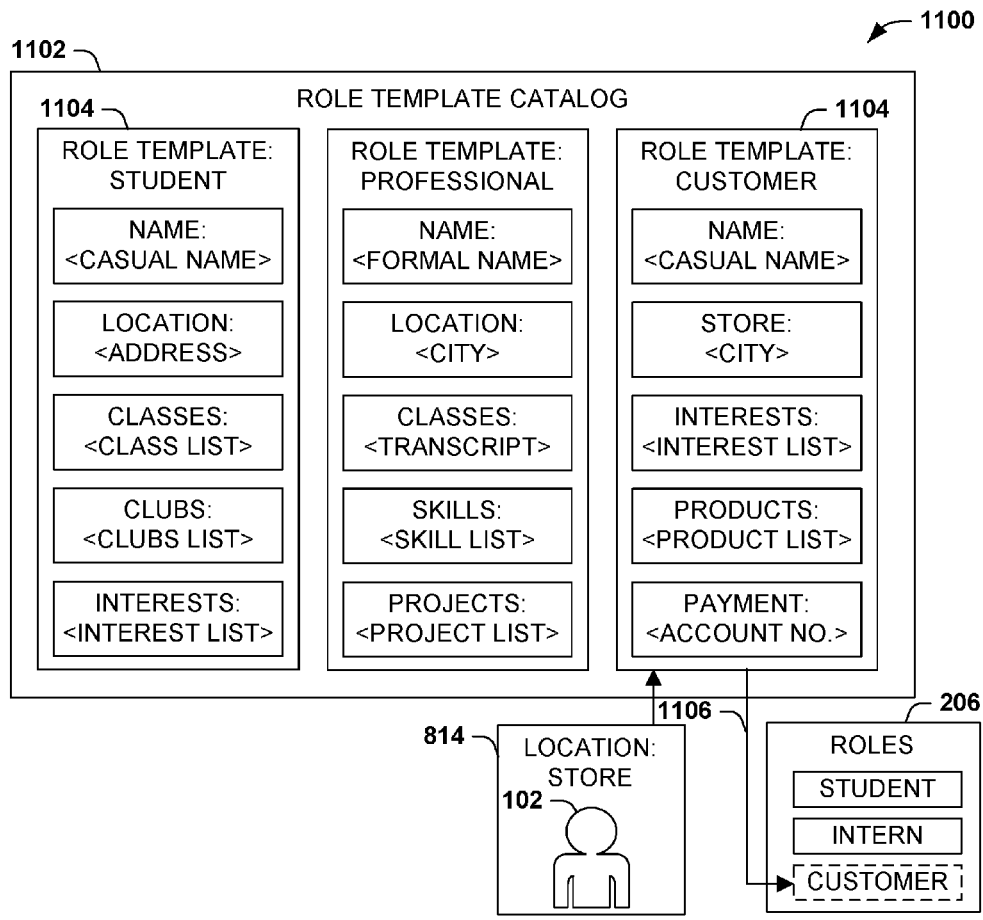
FIG. 11 is an illustration of an example scenario featuring a role template catalog that generates a role for an individual, in accordance with the techniques presented herein.

FIG. 11 presents an illustration of an example scenario 1100 featuring a role template catalog 102, comprising a set of role templates 1104 that are applicable to the individual profile 202 of the individual 102 in order to generate a suitable representation for a stock set of roles 206. In this example scenario 1100, as a first example, a student role template 1104 indicates a subset of individual profile details 106 that may be selected to represent the individual 102 as a type of student (e.g., the individual's casual name, home address, basic class list, clubs list, and interests list). As a second example, a professional role template 1104 indicates a subset of individual profile details 106 that may be selected to represent the individual 102 as a type of professional (e.g., the individual's formal name, city of residence, full class transcript including grades, and list of skills and projects that the individual 102 is utilizing in the professional context). As a third example, a customer role template 1104 indicates a subset of individual profile details 106 that may be selected to represent the individual 102 as a type of customer of a commercial service 108 (e.g., the individual's casual name, the nearest city to the individual's residence that includes a store for the service 108, a list of interests for targeted advertisements, a list of previously purchased products of the service 108, and payment account information). Responsive to arriving at a location 814 such as a store for the service 108, a suggestion may be presented to the individual 102 to create a role 206 on his or her device to represent the individual 102 as a customer of the service 108; and responsive to receiving an acceptance of the suggestion, the suggested role template 1104 may be deployed 1106 to the device to create a customer role 206 for the individual 102, and to generate the current role profile 214 when the customer role 206 is selected as the current role 212. Many such techniques may be utilized to generate the current role profile 214 for a current role 212 in accordance with the techniques presented herein.

E5. Role-Specific Provision of Service

A fifth aspect that may vary among embodiments of the techniques presented herein involves the manner of providing the service 108 to the individual 102 based upon the current role 212 and current role profile 214 of the individual 102.

As a first variation of this fifth aspect, a device and service 108 may interact in a variety of ways to achieve the customization of the service based on the current role 212. As a first such example, a device may represent the individual 102 to the service 108 using the current role profile 214, and in anticipation of the service 214 being personalized for the individual 102 according to the current role profile 214. Accordingly, the techniques presented herein may even be utilized with services 108 that are not aware of the variable roles 206 of the individual 102. As a second such example, a device of the individual 102 may identify the current role 212 of the individual 102, and may report the current role 212 of the individual 102 to a service 108 having access to the individual profile 102. The service 108 may then identify the portion of the individual profile comprising the current role profile 214, and may use the current role profile 214 to personalize the service. As a third such example, a device of the individual 102 may simply report the role determinants 210 to the service 108, which may identify the current role 212 of the individual 102, generate the current role profile 214, and provide the service according to the current role profile 214. Alternatively or additionally, the individual profile 102 may be reordered or reformatted to emphasize the portions that are associated with the current role 212, and to include but de-emphasize the portions that associated with roles 206 other than the current role 212 of the individual 102. For example, in a list of interests that describe the individual 102, a subset of interests that are associated with the current role 212 may be presented first, in a slightly larger or bolder font, and/or with more detail, while the other interests of the individual profile that are associated with other roles 206 of the individual 102 may be included but de-prioritized, such as presentation later, with a smaller or less bold font, and/or with less detail. Such prioritization may also reflect a weighted comparison of the signals identifying the current role 212 of the individual 102, such as more strongly emphasizing aspects associated with a current role 212, and choosing between de-prioritizing and hiding the unrelated interests of the individual 102, based on the identified confidence in the current role 212 of the individual 102.

As a second variation of this fifth aspect, a service 108 may represent an individual 102 to other individuals. Such scenarios include, e.g., social networks; dating services; professional and academic networking services; and gaming services. The service 108 may therefore enable a particular individual 102 define a set of roles 206 utilized by the individual 102 to interact with the service 108, and the current role profile 214 to be utilized by the service 108 to describe the individual 102 to a second individual in accordance with the current role 206 of the individual 102. For example, in a professional networking service, an individual 102 may interact with others utilizing a variety of contexts, such as the context of an employee for a company, a service provider for a current client, and a prospective service provider for a prospective client. The service 108 may detect the current role 212 of the individual 212 to a contact 808, and may represent the individual 102 to the contact 808 according to the current role 212 of the individual 102. In accordance with this variation, when the contact 808 transitions from a prospective client to a current client for the individual 108, the professional network may automatically transition the current role profile 214 presented to the client from a first current role profile 214 suitable for a prospective client to a second current role profile 214 suitable for a current client.

Figure 12:
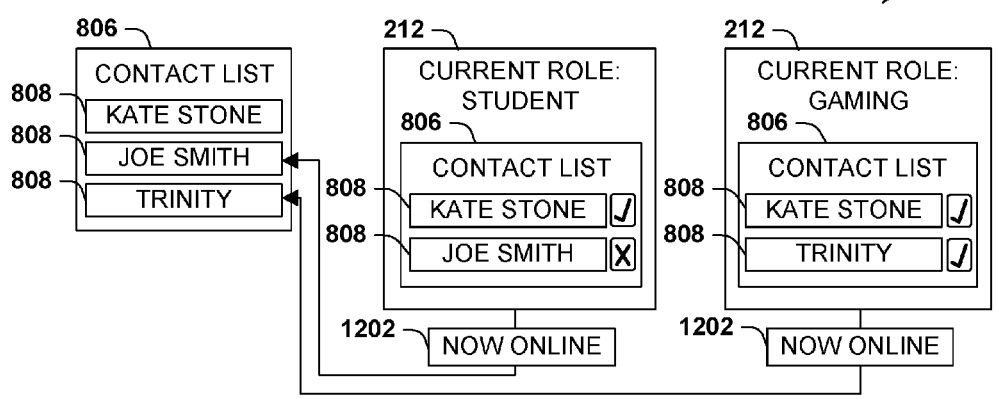
FIG. 12 is an illustration of an example scenario featuring the provision of a contact service according to a current role of an individual, in accordance with the techniques presented herein.

FIG. 12 presents an illustration of an example scenario 1200 featuring a third variation of this fifth aspect, involving a communication service 108 that indicates to each individual 102 the presence of the individual's contacts 808. In this example scenario 1200, the contacts 808 of the individual 102 may be partitioned into contacts 808 that are associated with the current role 212 of the individual 102, and contacts 808 that are not associated with the current role 212 of the individual 102. As a first such example, the service 108 may then filter the contact list 806 presented to the individual 102 to include only the contacts 808 who are associated with the current role 212 of the individual 102. The service 108 may also notify the individual 102 of the availability of contacts 808 according to whether or not the contact 808 is associated with the current role 212 of the individual 108; e.g., the service 108 may notify the individual 108 of the availability or unavailability of a first contact 808 that is associated with the current role 212 of the individual 102, and may refrain from notifying the individual 102 that a second contact 808 that is not associated with the current role 212 is available.

As further illustrated in the example scenario 1200 of FIG. 12, the service 108 may use the association of the contacts 808 with the current role 212 of the individual 102 to determine the notification of the availability of the individual 102 to the contact 808. For example, for a first contact 808 that is associated with the current role 212 of the individual 102, the service 108 may notify the first contact 808 that the individual 102 is available in association with the current role 212 (e.g., notifying the contact 808 not only that the individual 102 is available for contact, but is available to communicate in the current role 212); and for a second contact 808 that is not associated with the current role 212 of the individual 102, the service 108 may refrain from notifying the second contact 808 of the availability of the individual 102, even if the individual 102 is otherwise available for communication. Moreover, when the individual 102 transitions from a first current role 212 to a second current role 212, the service 108 may notify contacts 808 who are only associated with the first current role 212 that the individual 102 is no longer available; may notify contacts 808 who are only associated with the second current role 212 that the individual 102 has become available in the second current role 212; and may notify contacts 808 who are associated with both the first current role 212 and the second current role 212 that the individual 102 is still available, but is available in the second current role 212 rather than the first current role 212.

Figure 13:
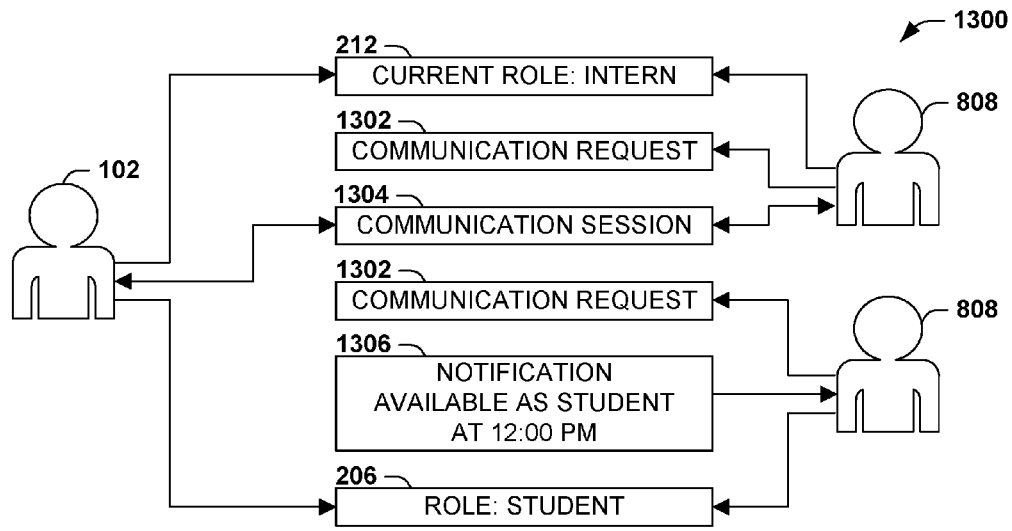
FIG. 13 is an illustration of an example scenario featuring a provision of a communication service according to a current role of an individual, in accordance with the techniques presented herein.

FIG. 13 presents an illustration of an example scenario 1300 featuring a fourth variation of this fifth aspect, wherein an individual 102 communicates with the contacts 808 of the communication service 108 according to the current role 212 of the individual 102. In this example scenario 1300, the individual 102 receives requests from the contacts 808 to communicate with the individual 102 in a selected role (e.g., a request to communicate with the individual 102 in a student role 206). Responsive to receiving a communication request 1302, the service 108 may determine a selected role 808 with which the individual requests to communicate with the individual 102. If the selected role specified by the contact 808 matches the current role 212 of the individual 102, the service 108 may initiate a communication session 1504 between the individual 102 and the contact 808 (and, optionally, may notify the individual 102 of the selected role 808); but if the selected role does not match the current role 212 of the individual 102, the service 108 may refrain from initiating the communication session 1504 between the individual 102 and the contact 808. As a further variation, responsive to determining that the selected role does not match the current role 212 of the individual 102, the service 108 may predict a subsequent time when the individual 102 is predicted to have a current role 212 matching the selected role, and present to the contact 808 a notification 1206 that informs the contact 808 of the subsequent time.

As a fifth variation of this fifth aspect, a communication service 108 may enable an individual 102 to communicate with other individuals 102 using various communications modalities (e.g., a video communication modality, an audio-only communication modality, and a text-only communication modality; or an English language communication modality, a French language communication modality, and a Spanish language communication modality). Respective roles 206 of the individual 102 may be associated with a particular communication modality, and responsive to receiving a request from the individual 102 to initiate a communication, the communication service 108 may identify a selected communication modality that is associated with the current role 212 of the individual 102, and may initiate the communication in the selected communication modality. As another example, a device may update various language aspects of the user interfaces within the computing environment to utilize a selected language that is associated with the current role 212 of the individual 102, such as using text labels, numeric representations, keyboard settings, and calendar properties of American English while the individual 102 is in a first role, and the corresponding properties for French while the individual 102 is in a second role.

As a sixth variation of this fifth aspect, the service 108 may utilize the current role 212 of the individual 102 to select content to be presented to the individual 102. As a first such example, a service 108 may identify, among an item set, a recommended item that is associated with one or more individual profile details 106 of the current role profile 214, and present a recommendation of the recommended item to the individual 102. Such content items may include, e.g., news articles; media, such as music, speeches, images, and/or video; products; websites; and/or advertisements therefor. The selection of such content may also be presented in a prioritized way, e.g., by sorting content in a content feed to first present content that is associated with the current role 212 of the individual 102 before presenting content that is still of interest to the individual 102, but that is associated with roles 206 other than the current role 212.

Figure 14:
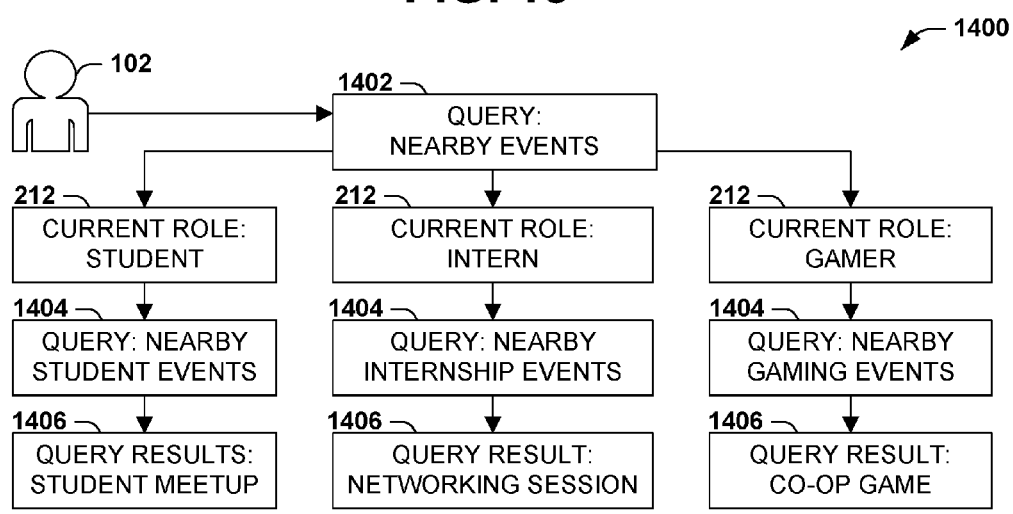
FIG. 14 is an illustration of an example scenario featuring a provision of a search service according to a current role of an individual, in accordance with the techniques presented herein.

FIG. 14 presents an illustration of an example scenario 1400 featuring a seventh variation of this fifth aspect, wherein the service 108 utilizes the current role 212 of an individual 102 to evaluate a search query 1402 of the individual 102. In this example scenario 1400, the individual 102 presents to a search service 108 a search query 1402 requesting a list of nearby events. However, rather than presenting a generalized list of events that may or may not be of interest to the individual 102, the service 108 may utilize the current role 212 of the individual to disambiguate the search query 1402, and may evaluate the search query 1402 in accordance with the individual profile details 106 of the current role profile 214. For example, if the individual 102 is currently interacting in the current role 212 of a student, an adjusted search query 1404 may request a list of nearby student-oriented events; if the individual 102 is currently interacting in the current role 212 of an intern, an adjusted search query 1404 may request a list of nearby internship-oriented events; and if the individual 102 is currently interacting in the current role 212 of a gamer, an adjusted search query 1404 may request a list of nearby gaming-oriented events. The respective adjusted search queries 1404 may result in the identification and presentation to the individual 102 of at least one search query result 1406 that is suitable for the current role 212 of the individual 102.

As an eighth variation of this fifth aspect, the identification of the current role 212 of the individual 102 may enable the application of a privacy filter. For example, a first role 206 of the individual 102 may involve a privacy interest (e.g., while participating in a gaming role 206, the individual 102 may wish to utilize a pseudonym rather than the given name of the individual 102), whereas a second role 206 of the individual 102 may not involve a privacy interest. A service 108 may therefore apply a privacy filter to the individual profile 102 that is suitable for the current role 212 of the individual 102.

As a ninth variation of this fifth aspect, the variable current role 212 of the individual 102 may inform the provision of networking services to the individual 102. For example, when the individual 102 is interacting in a current role 212, the service 108 may identify, among an individual set, a second individual having a second individual profile that matches the current individual profile 214 associated with the current role 212 of the individual 102 (e.g., a second individual in the same or similar community, and/or having the same or similar skills as the individual 102), and may introduce the second individual to the individual 102.

Figure 15:
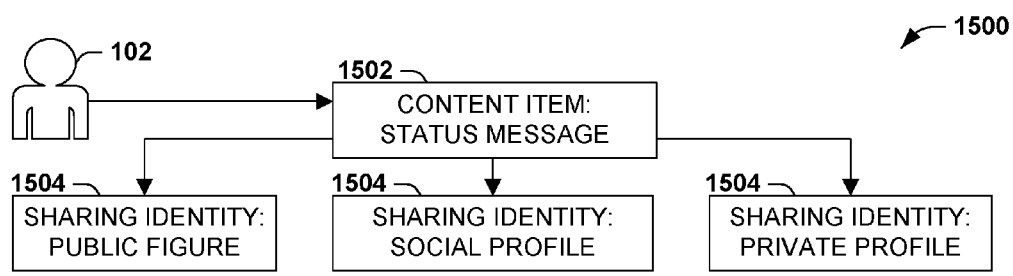
FIG. 15 is an illustration of an example scenario featuring a provision of a shared items according to a current role of an individual, in accordance with the techniques presented herein.

FIG. 15 presents an illustration of an example scenario 1500 featuring a tenth variation of this fifth aspect, wherein the individual 102 has a set of sharing identities 1504 through which content items 1502 are shared with other individuals (e.g., a set of blogs to which the individual 102 contributes). A service 108 may determine that the roles 206 of the individual 102 are respectively associated with a particular sharing identity 1504 of the individual 102; and responsive to receiving from the individual 102 a request to share a content item 1502, the service 108 may determine the current role 212 of the individual 102, may identify a selected sharing identity 1504 that is associated with the current role 212 of the individual 102, and may share the content item 1502 through the selected sharing identity 1504.

As an eleventh variation of this fifth aspect, a transactional service 108, such as a commercial service or a financial service, may enable the individual 102 to initiate transactions through various roles 206, such as personal transactions on behalf of the individual 102, and professional transactions on behalf of a company of the individual 102. The current role profile 214 for each role 206 may indicate different information for performing transactions through the role 206, such as a service account number, a billing account, and a shipping destination for services. Accordingly, responsive to receiving a request from the individual 102 to perform a transaction, the service 108 may perform the transaction using the individual profile details 106 of the current role profile 214 of the current role 212 of the individual 102. Many such adjustments of services 108 according to the current role 212 of the individual 102 may be devised in accordance with the techniques presented herein.

E6. Privacy Considerations

A sixth aspect that may vary among embodiments of the techniques presented herein involves the manner of accounting for the privacy sensitivity of the individual 102 in the application of the techniques presented herein.

As a first variation of this sixth aspect, the monitoring of role determinants 210 by the service 108 may be adapted to evaluate particular types of information and/or sources, but not to evaluate other types of information and/or sources. For example, an individual 102 may be amenable to the adaptation of the service 108 based upon the individual's device usage (e.g., applications utilized) and navigation history, but uncomfortable with the adaptation of the service 108 based upon the individual's conversations and interaction with other online services. Various aspects of the monitoring may therefore be adapted to enable the individual 102 to specify whether the device is to utilize, or not utilize, various types and/or sources of information in the monitoring of role determinants 210 and the identification of the current role 212 of the individual 102.

Figure 16:
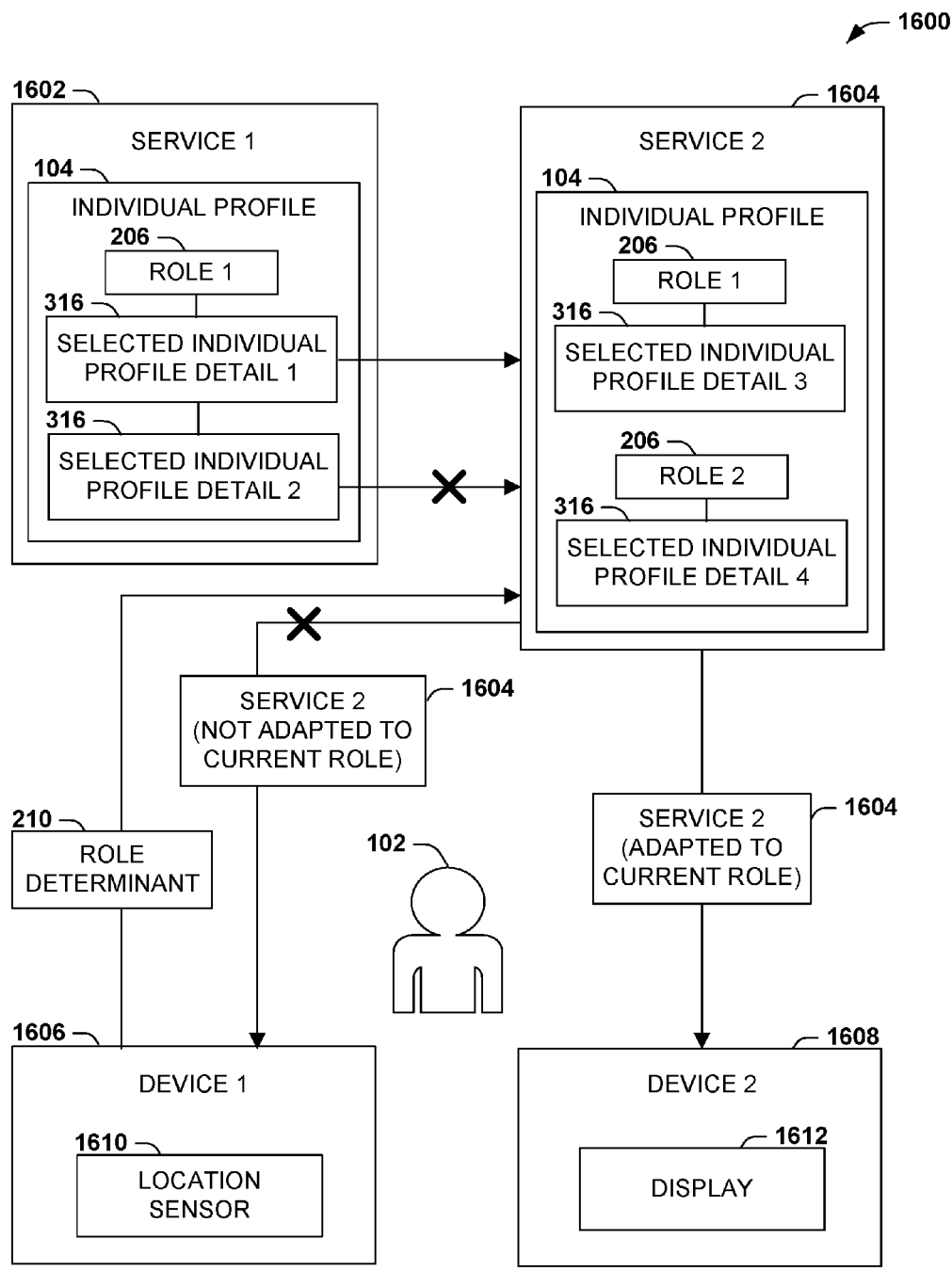
FIG. 16 is an illustration of an example scenario featuring a first privacy technique for conforming the adaptation of a service to the current role of an individual in accordance with the techniques presented herein.

FIG. 16 presents an illustration of an example scenario 1600 wherein the adaptation of a service 108 according to the current role 212 of the individual 102 is performed in view of various privacy considerations of the individual 102. In this example scenario 1600, the individual 102 utilizes a first service 1602 and a second service 1604, each of which stores a set of individual profile details 316 that are associated with various roles 206 of the individual 102. The individual 102 also interacts with a first device 1608 having a location sensor 1610, and a second device 1608 having a display 1612. In accordance with the techniques presented herein, the devices may detect role determinants 210 that indicate the current role 212 of the individual 102, and the services may be provided to the individual 102 according to selected individual profile details 316 that match the current role 212 of the individual 102; however, further adaptation of such techniques may be implemented in view of the sensitivity of the individual 102 to the collection and use of such information.

As a first such example, the individual 102 may find it acceptable for the first device 1606 to collect and report information from the location sensor 1610 that may be utilized as a role determinant 210, but not from the second device 1608, e.g., if the second device 1608 is regarded as a discreet personal device collecting information that the individual 102 does not want to have shared with the services. As a second such example, the first service 1602 and the second service 1602 may share some individual profile details 316 about the roles 206 of the individual 102, but the individual 102 may prefer that a particular role 206 is known to the second service 1604 and not the first service 1602, such that the first service 1602 may refrain from any adaptation based on the selection of the particular role 206 as the current role 212 of the individual 102. As a third such example, the individual 102 may find it acceptable for the first service 1602 to share some individual profile details 316 with the second service 1604 for the adaptation of the second service 1604 according to the current role 212 of the individual 102, but may prefer other individual profile details 316 to be retained by the first service 1602 and not shared with the second service 1604, even if such individual profile details 316 relate to the current role 212 of the individual 102 and the provision of the second service 1604 to the individual 102. As a fourth such example, the individual 102 may prefer that the second service 1604 adapts to the current role of the user 212 when interacting with the second device 1608 (e.g., when the second service 1604 is presented on the display 1612 of the second device 1608), but not when the second service 1604 is presented on the first device 1606. As one such example, the first device 1606 may comprise a computer provided by an employer, while the second device 1608 is a highly personal device, such as a personal mobile phone used only to communicate with close family members. The individual 102 may consent to the first device 1606 providing information to the services that enables the customization, while preferring that the second device 1608 provides no such information. Conversely, the individual 102 may prefer the second device 1608 to present the second service 1604 customized in a personal manner based on the current role 212 of the individual 102, but may not wish such personalization to be implemented while accessing the service through the first device 1606 that the individual 102 does not own.

These privacy-aware adaptations may be achieved in many ways. As a first such example, the individual 102 may specify such privacy sensitivity details, such as indicating which devices may collect and share role determinants 210 and current roles 212; which services 108 may be personalized, using which roles 206 and individual profile details; and whether respective devices 104 may present the service 108 in a manner that is adapted to the current role 212 of the individual 102. As a second such example, information may be utilized by default unless the individual 102 expresses disagreement and/or displeasure with such uses, and a negative reaction of the individual 102 to such usage may result in a reduction of the collection, use, and personalization based upon such information. As a third such example, the use of individual profile details and role determinants 210 may be contingent upon the context of such usage; e.g., a service 108 may be personalized based upon roles 206 and/or individual profile details that are closely relevant to the service 108, and may not be personalized upon roles 206 and/or individual profile details that are not particularly germane to the service 108. As a fourth such example, the particular roles and/or individual profile details may be assigned a particular sensitivity based upon a general population heuristic (e.g., individuals 102 are generally highly sensitive to the collection and use of health-related information, less sensitive to the collection and use of social interactions, and routinely accustomed to the collection and use of location information), and the personalization of services may be adapted based upon the sensitivity of such roles 206 and/or individual profile details, either by the general public or by a particular demographic to which the individual 102 belongs. Many such details may be utilized to adapt the collection of role determinants 210, the personalization of a service based upon a selection of selected individual profile details 316, and the presentation of the personalized service to the individual 102 through one or more devices 104, in accordance with the techniques presented herein.

Figure 17:
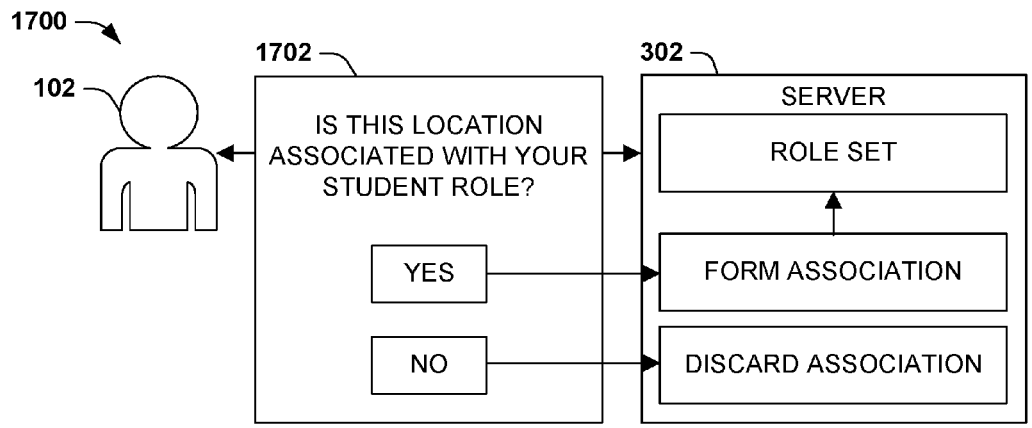
FIG. 17 is an illustration of an example scenario featuring a second privacy technique for conforming the adaptation of a service to the current role of an individual in accordance with the techniques presented herein.

FIG. 17 presents an illustration of an example scenario 1700 involving a second variation of this sixth aspect, involving the full notification and consent of the individual 102 in the adaptation of a service 108 provided by a server 302. In this example scenario 1700, the server 302 monitors a set of role determinants 210 of an individual 102, and forms associations between detected role determinants 210 and the current role 212 of the individual 102, in order to interact with the individual 102 in a role-appropriate manner. However, in some respects, such monitoring and automated evaluation may be surprising or undesired by the individual 102; e.g., an embodiment that is too savvy and accurate at monitoring the role determinants 210 of the individual 102 may impart an unpleasant sense of overmonitoring and/or continuous evaluation. As another example, scenarios in which the detection of the current role 212 of the individual 102 is achieved in a manner that is surprising to the individual 102 may appear to be uncanny, and the individual 102 may be uncomfortable with such automated adaptation without understanding the mechanics of the determination. Accordingly, the server 302 may make the formation of associations between role determinants 210 and respective roles 120 of the individual 102 contingent upon explicitly informing the individual 102 of such associations, and/or receiving consent from the individual 102 to form and utilize such associations. For example, a particular location may be heavily correlated with the individual's participation in a student role 120, but the individual 102 may not be aware of the correlation, and automatically switching to the student role when the user approaches the location may surprise the individual 102. Such discomfort may be alleviated by presenting to the individual 102, before establishing the association, information that expresses the correlation to the individual 102, and an offer 1702 to associate the location (as a role determinant 210) with the student role 120. If the server 302 receives an acceptance of the offer 1602 from the individual 102, the server 302 may form the association and thereafter utilize the detection of the location to select the student role 120 as the current role 212 of the individual 102; and upon failing to receive an acceptance of the offer 1702, the server 302 may determine that the individual 102 does not wish the current role 212 to be selected based on this location, and may refrain from forming the association. In this manner, the server 302 may fully apprise the individual 102 of the mechanics of the role determination and the adaptation of the service 108, and may make such adaptation contingent upon the consent of the individual 102.

As a third such example, various forms of "privacy modes" may be included to perform role determination in a privacy-sensitive manner. As a first such example, a server 302 or service 108 may include a toggle for a "privacy mode," which, when activated, reduces the monitoring of role determinants 210, the determination of a current role 212, and/or the adaptation of a service 108. As a second such example, a "privacy mode" may be applied as a threshold, e.g., such that less privacy-centric role determinants 210 are utilized in role determination, and more privacy-centric role determinants 210 are not utilized in role determination. As a third such example, a "privacy mode" may be automatically activated and/or deactivated; e.g., upon determining that a conversation involving the individual 102 includes terms that are associated with a high privacy sensitivity, a server 302 or service 108 may temporarily refrain from detecting or utilizing role determinants 210. Many such mechanisms for respecting the privacy of the individual 102 may be devised and included in the application of the techniques presented herein.

E7. Wearable Device Examples

Some examples of scenarios that are particularly adaptable to the utilization of the techniques presented herein involve the use of "wearable" devices. Such devices are often utilized in a more casual manner; e.g., an individual 102 may continuously possess and wear such devices in both scenarios where the individual 102 is willing to interact with a device, and in scenarios where the individual 102 wishes to minimize device interaction, such as social engagements. The techniques presented herein may be advantageous in such scenarios to enable the device 102 to inform a service 108 of the current role 212 of the individual 102, such that the service 108 may be provided according to the individual profile details that are relevant to the current role 212 of the individual 102. For example, the service may store a variety of information that is of value to the individual 102 in various scenarios, but the detection and and use of the role determinants 210 to identify the current role 212 of the individual 102 may reduce the amount of user interaction with the device and/or service 108 to access the information that is relevant to the current role 212 of the individual 102.

Figure 18:
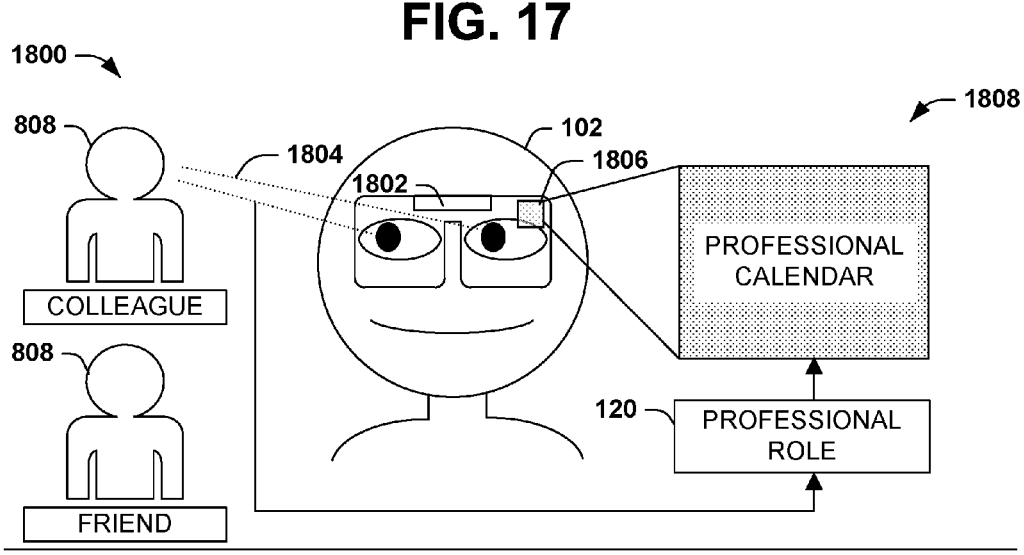
FIG. 18 is an illustration of an example scenario featuring a wearable device that may enable role detection and the adaptation of a service to the current role of an individual in accordance with the techniques presented herein.
Figure 18:
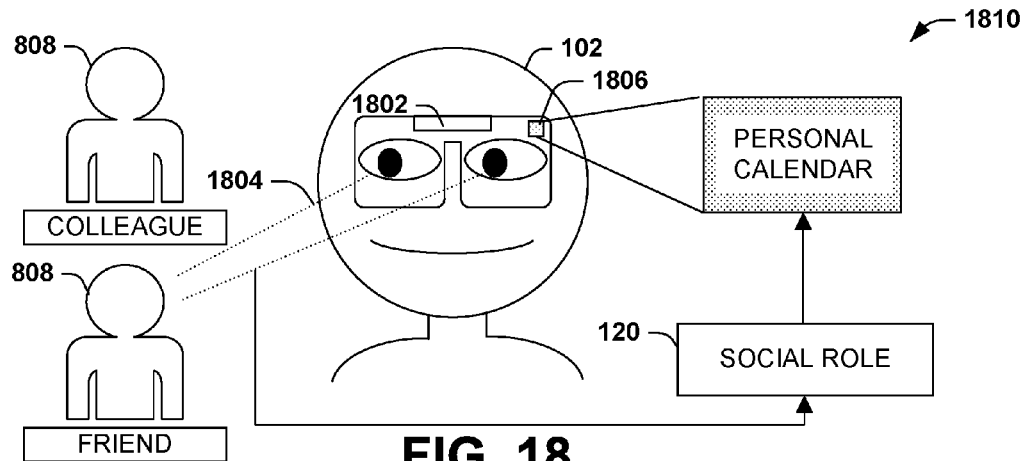

FIG. 18 presents an illustration of an example scenario 1800 featuring one such wearable device, comprising eyewear 1802 that is capable both of tracking the gaze of the individual 102 and presenting information within the visual field of the individual. As a first example, the eyewear 1802 may evaluate the activities of the individual 102 with other people and aspects of the environment, such as detecting, among a set of people in the vicinity of the individual 102, a particular contact 808 with whom the individual 102 is currently interacting, and may utilize the relationship between the individual 102 and the contact 808 as a role determinant 210 of the current role 212 of the individual 102. For example, the eyewear 1802 may apply a gaze-tracking technique 1804 to detect when the individual 102 is engaging with a first contact 808 who is a professional colleague, and when the individual 102 is engaging with a second contact 808 who shares a friendship with the individual 102. Accordingly, at a first time 1808 when the individual 102 is interacting with a contact 808 who has a professional relationship with the individual 102, and the device may choose a professional role 120 as the current role 212 of the individual 102. For example, at a second time 1810 when the individual 102 is interacting with a contact 808 who has a friendship with the individual 102, and the device may choose a social role 120 as the current role 212 of the individual 102. The device may then notify the service 108 of the current role 212, which may provide the service 108 (through the device or through another interface) according to the current role 212 of the individual 102. For example, the service 108 may vary both the selection and the presentation of information to the individual 102, through the eyewear 1802, according to the current role 212 of the individual 102. For example, at a first time 1808, when the individual 1802 is in a professional current role 202, the service 108 may transmit to the eyewear 1802 (or to a different device, such as a display of a laptop computer that the individual 102 is utilizing) a larger display overlay 1806 that presents a professional calendar in a large size that presents a significant amount of information that is relevant to the current role 212. However, at a second time 1808, when the individual 1802 is in a social current role 212, the service 108 may transmit to the eyewear 1802, or another device, a smaller display overlay 1806 that presents a personal calendar in a smaller size that is less likely to distract the attention of the individual 102 from a social interaction. The adaptation of the presented content to the current role 212, as well as the adaptation of the user interface to adjust a level of detail and/or distraction, may be adaptable to suit the current role 212 of the individual 102. Many such variations may be included to suit the particular interaction model of the individual 102 with the service 108 utilizing various types of wearable devices in accordance with the techniques presented herein.

F. Computing Environment

Figure 19:
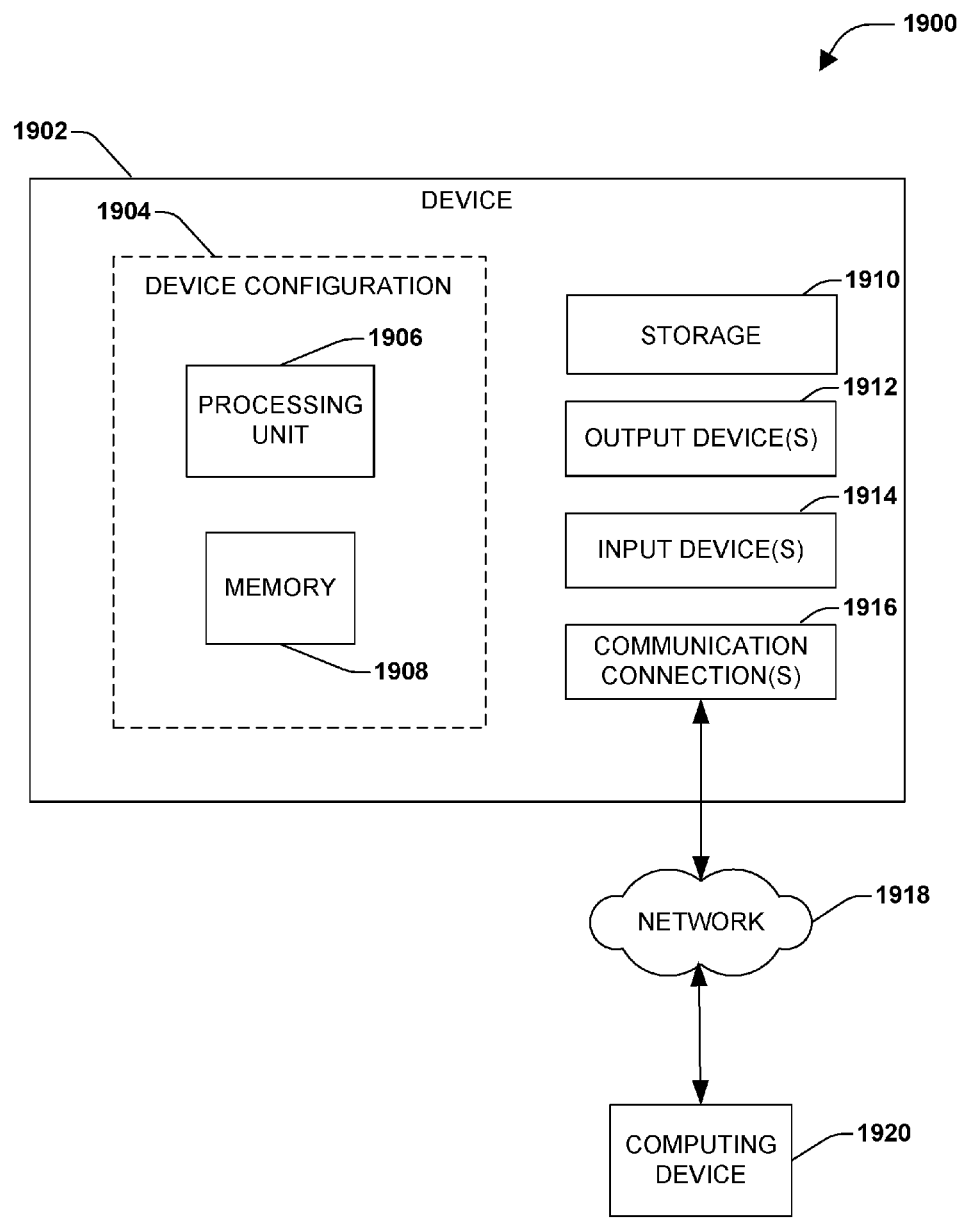
FIG. 19 is an illustration of an example computing environment wherein one or more of the provisions set forth herein may be implemented.

FIG. 19 and the following discussion provide a brief, general description of a suitable computing environment to implement embodiments of one or more of the provisions set forth herein. The operating environment of FIG. 19 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 19 illustrates an example of a system 1900 comprising a computing device 1902 configured to implement one or more embodiments provided herein. In one configuration, computing device 1902 includes at least one processing unit 1906 and memory 1908. Depending on the exact configuration and type of computing device, memory 1908 may be volatile (such as RAM, for example), non-volatile (such as ROM, flash memory, etc., for example) or some combination of the two. This configuration is illustrated in FIG. 19 by dashed line 1904.

In other embodiments, device 1902 may include additional features and/or functionality. For example, device 1902 may also include additional storage (e.g., removable and/or non-removable) including, but not limited to, magnetic storage, optical storage, and the like. Such additional storage is illustrated in FIG. 19 by storage 1910. In one embodiment, computer readable instructions to implement one or more embodiments provided herein may be in storage 1910. Storage 1910 may also store other computer readable instructions to implement an operating system, an application program, and the like. Computer readable instructions may be loaded in memory 1908 for execution by processing unit 1906, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1908 and storage 1910 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1902 may also include communication connection(s) 1916 that allows device 1902 to communicate with other devices. Communication connection(s) 1916 may include, but is not limited to, a modem, a Network Interface Card (NIC), an integrated network interface, a radio frequency transmitter/receiver, an infrared port, a USB connection, or other interfaces for connecting computing device 1902 to other computing devices. Communication connection(s) 1916 may include a wired connection or a wireless connection. Communication connection(s) 1916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1902 may include input device(s) 1914 such as keyboard, mouse, pen, voice input device, touch input device, infrared cameras, video input devices, and/or any other input device. Output device(s) 1912 such as one or more displays, speakers, printers, and/or any other output device may also be included in device 1902. Input device(s) 1914 and output device(s) 1912 may be connected to device 1902 via a wired connection, wireless connection, or any combination thereof. In one embodiment, an input device or an output device from another computing device may be used as input device(s) 1914 or output device(s) 1912 for computing device 1902.

Components of computing device 1902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1902 may be interconnected by a network. For example, memory 1908 may be comprised of multiple physical memory units located in different physical locations interconnected by a network.

Those skilled in the art will realize that storage devices utilized to store computer readable instructions may be distributed across a network. For example, a computing device 920 accessible via network 1918 may store computer readable instructions to implement one or more embodiments provided herein. Computing device 1902 may access computing device 920 and download a part or all of the computer readable instructions for execution. Alternatively, computing device 1902 may download pieces of the computer readable instructions, as needed, or some instructions may be executed at computing device 1902 and some at computing device 920.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. One or more computing devices comprising:
   one or more processors; and
   one or more memory storing computer-executable instructions, which, when executed by the one or more processors, cause the one or more computing devices, in aggregate, to:
   provide a computer-network-accessible service that is interacted with by an individual user, the individual user having multiple roles and interacting with the service differently depending on which of the multiple roles the individual user has assumed during the individual user's interaction with the service;
   receive a detected action of the individual user;
   select, from among the multiple roles, a current role of the individual user based on the detected action of the individual user, the detected action having been previously associated with the current role as a role determinant of the current role; and
   select a current role profile, which controls the individual user's interactions with the service, based on the selected current role, the current role profile comprising an explicit enumeration of both: (1) at least one included profile detail and (2) at least one excluded profile detail.

2. The one or more computing devices of claim 1, wherein the one or more memory stores further computer-executable instructions, which, when executed by the one or more processors, cause the one or more computing devices, in aggregate, to:
present, to a second individual user, a description of the individual user, the description comprising the at least one included profile detail and excluding the at least one excluded profile detail.

3. The one or more computing devices of claim 1, wherein the one or more memory stores further computer-executable instructions, which, when executed by the one or more processors, cause the one or more computing devices, in aggregate, to:
notify a first contact of the individual user that the individual user is online, the first contact being specified by the at least one included profile detail; and
notify a second contact of the individual user that the individual user is offline, the second contact being specified by the at least one excluded profile detail.

4. The one or more computing devices of claim 1, wherein the one or more memory stores further computer-executable instructions, which, when executed by the one or more processors, cause the one or more computing devices, in aggregate, to:
present information about the individual user to other individual users of the service based on a privacy filter specified by the at least one included profile detail.

5. The one or more computing devices of claim 1, wherein the one or more memory stores further computer-executable instructions, which, when executed by the one or more processors, cause the one or more computing devices, in aggregate, to:
match one or more other individual users with the individual user based on the at least one included profile detail.

6. The one or more computing devices of claim 1, wherein the one or more memory stores further computer-executable instructions, which, when executed by the one or more processors, cause the one or more computing devices, in aggregate, to:
receive, from a second individual user of the service, a request to initiate, through the service, communication with the individual user in a specified role;
initiate communication between the second individual user and the individual user through the service if the specified role is the current role of the individual user; and
deny communication between the second individual user and the individual user through the service if the specified role is not the current role of the individual user.

7. The one or more computing devices of claim 6, wherein the one or more memory stores further computer-executable instructions, which, when executed by the one or more processors, cause the one or more computing devices, in aggregate, to:
determine a subsequent time when the individual user is predicted to be associated with the specified role if the specified role is not the current role of the individual user; and
specify the subsequent time to the second individual user if the specified role is not the current role of the individual user.

8. The one or more computing devices of claim 1, wherein the detected action is a physical movement by the individual user detected by either a wearable sensor worn by the individual user or a camera communicationally coupled to a computing device utilized by the individual user to interact with the service.

9. The one or more computing devices of claim 1, wherein the detected action comprises keywords utilized by the individual user as detected by a computing device that is also utilized by the individual user to interact with the service.

10. The one or more computing devices of claim 1, wherein the detected action comprises attire of the individual user detected by a sensor communicationally coupled to a computing device utilized by the individual user to interact with the service.

11. The one or more computing devices of claim 1, wherein the detected action comprises resources accessed by the individual user with a computing device that is also utilized by the individual user to interact with the service.

12. The one or more computing devices of claim 1, wherein the computer-executable instructions for selecting the current role of the individual user comprise computer-executable instructions which, when executed by the one or more processors, cause the one or more computing devices, in aggregate, to select the current role of the individual user based on both the detected action of the individual user and a detected descriptor of the individual user's environment, the detected descriptor of the individual user's environment having been previously associated with the current role as another role determinant of the current role; and
wherein further the one or more memory stores further computer-executable instructions, which, when executed by the one or more processors, cause the one or more computing devices, in aggregate, to: receive the detected descriptor of the individual user's environment.

13. The one or more computing devices of claim 12, wherein the detected descriptor of the individual user's environment comprises indications of one or more other individuals that are physically proximate to the individual user as detected by either an audio sensor communicationally coupled to a computing device that is utilized by the individual user to interact with the service or a video sensor communicationally coupled to the computing device that is utilized by the individual user to interact with the service.

14. The one or more computing devices of claim 12, wherein the detected descriptor of the individual user's environment comprises identifications of one or more other computing devices that are physically proximate to a computing device that is utilized by the individual user to interact with the service.

15. The one or more computing devices of claim 1, wherein the one or more memory stores further computer-executable instructions, which, when executed by the one or more processors, cause the one or more computing devices, in aggregate, to:
receive a second detected action of the individual user;
select a second current role of the individual user based on the second detected action of the individual user, the second detected action having been previously associated with the second current role as a role determinant of the second current role;
select a second current role profile based on the selected second current role, the second current role profile comprising an explicit enumeration at least one included second profile detail; and determine that the second current role is complementary to the current role;

wherein, responsive to the determining that the second current role is complementary to the current role, the individual user's interactions with the service are controlled by a combination of: (1) the at least one included profile detail and (2) the at least one included second profile detail.

16. The one or more computing devices of claim 15, wherein the one or more memory stores further computer-executable instructions, which, when executed by the one or more processors, cause the one or more computing devices, in aggregate, to:

notify contacts of the individual user that the individual user is online, the contacts being specified by a combination of the at least one included profile detail and the at least one included second profile detail.

17. A computing device comprising:
one or more processors;
a network interface; and
one or more memory storing computer-executable instructions, which, when executed by the one or more processors, cause the computing device to:
communicate, via the network interface, with one or more server computing devices executing a computer-network-accessible service to enable an individual user of the computing device to interact with the service, the individual user having multiple roles and interacting with the service differently depending on which of the multiple roles the individual user has assumed during the individual user's interaction with the service;
detect either an action of the individual user or a descriptor of the individual user's environment;
select, from among the multiple roles, a current role of the individual user based on either the detected action of the individual user or the detected descriptor of the individual user's environment, the detected action or the detected descriptor of the individual user's environment having been previously associated with the current role as role determinants of the current role; and
notify, via the network interface, the service of the selected current role;
wherein the detected action of the individual user comprises at least one of:
a physical movement by the individual user detected by either a wearable sensor worn by the individual user or a camera communicationally coupled to the computing device; or
attire of the individual user detected by a sensor communicationally coupled to the computing device; and
wherein the detected descriptor of the individual user's environment comprises at least one of:
one or more other individuals that are physically proximate to the individual user as detected by either an audio sensor communicationally coupled to the computing device or a video sensor communicationally coupled to the computing device; or
identifications of one or more other computing devices that are physically proximate to the computing device.

18. A method of modifying provision of a computer-network-accessible service to an individual user based on a determined role within which the individual user is interacting with the service, the method comprising:

receiving, at a computing device, either a detected action of the individual user or a detected descriptor of the individual user's environment;

selecting, by the computing device, from among the multiple roles, a current role of the individual user based on either the detected action of the individual user or the detected descriptor of the individual user's environment, the detected action or the detected descriptor of the individual user's environment having been previously associated with the current role as role determinants of the current role; and selecting, by the computing device, a current role profile, according to which the provision of the service to the individual user will be modified, the selecting being based on the selected current role, the current role profile comprising an explicit enumeration of both: (1) at least one included profile detail and (2) at least one excluded profile detail.

19. The method of claim 18, wherein the detected action of the individual user comprises at least one of:
a physical movement by the individual user detected by either a wearable sensor worn by the individual user or a camera communicationally coupled to the computing device; or
attire of the individual user detected by a sensor communicationally coupled to the computing device; and
wherein the detected descriptor of the individual user's environment comprises at least one of:
one or more other individuals that are physically proximate to the individual user as detected by either an audio sensor communicationally coupled to the computing device or a video sensor communicationally coupled to the computing device; or
identifications of one or more other computing devices that are physically proximate to the computing device.

20. The method of claim 18, further comprising:
receiving a second detected action of the individual user;
selecting a second current role of the individual user based on the second detected action of the individual user, the second detected action having been previously associated with the second current role as a role determinant of the second current role;
selecting a second current role profile based on the selected second current role, the second current role profile comprising an explicit enumeration at least one included second profile detail; and
determining that the second current role is complementary to the current role;
wherein, responsive to the determining that the second current role is complementary to the current role, the individual user's interactions with the service are controlled by a combination of: (1) the at least one included profile detail and (2) the at least one included second profile detail.

* * * * *